United States Patent Office  3,312,953
Patented Apr. 4, 1967

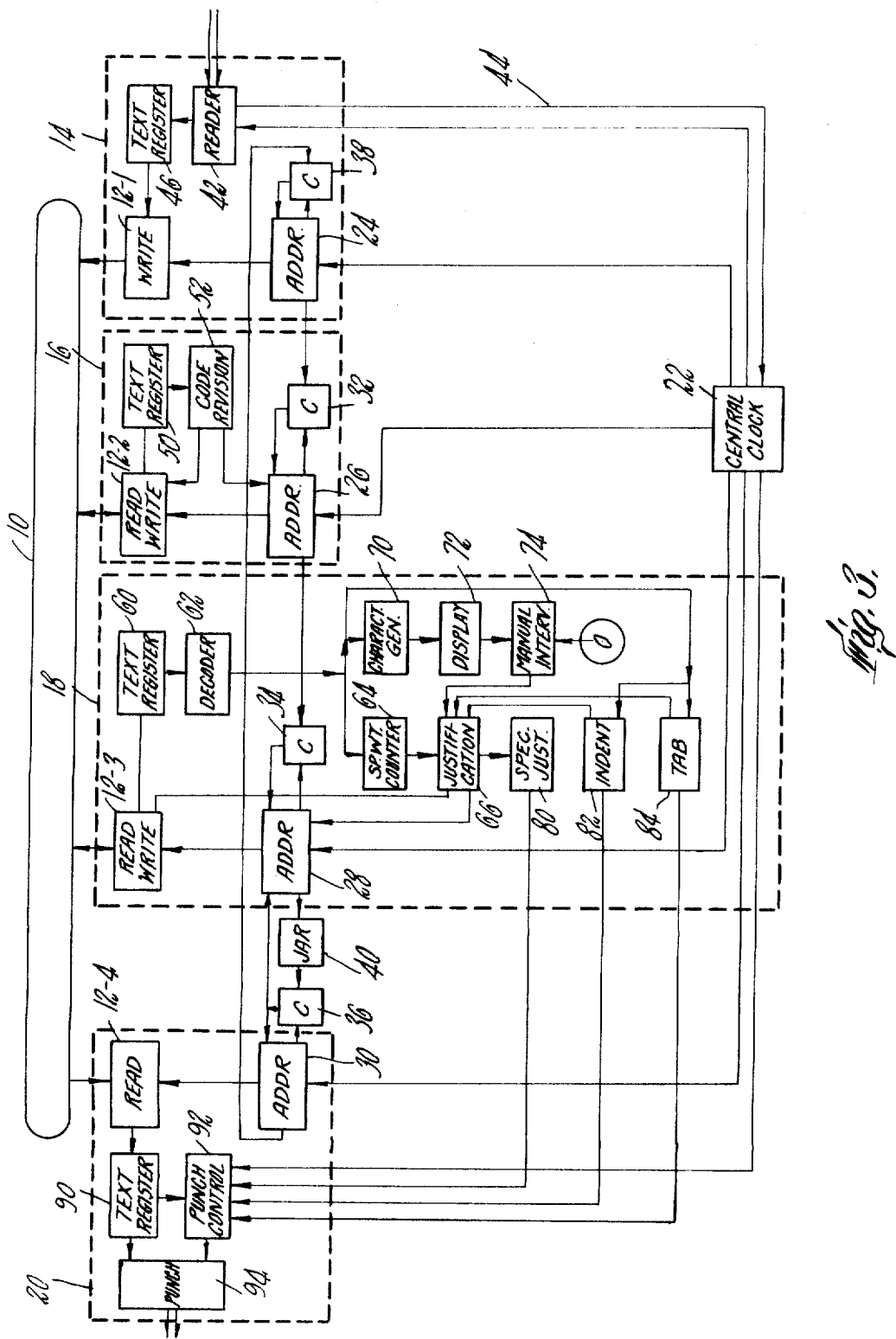

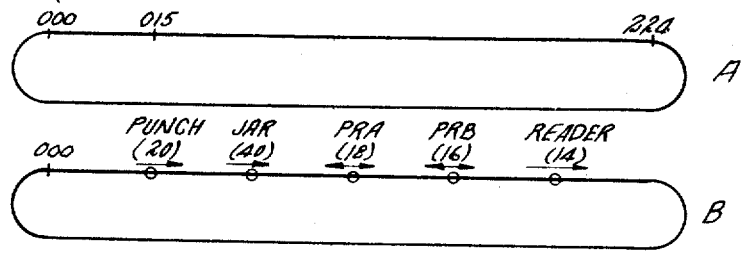
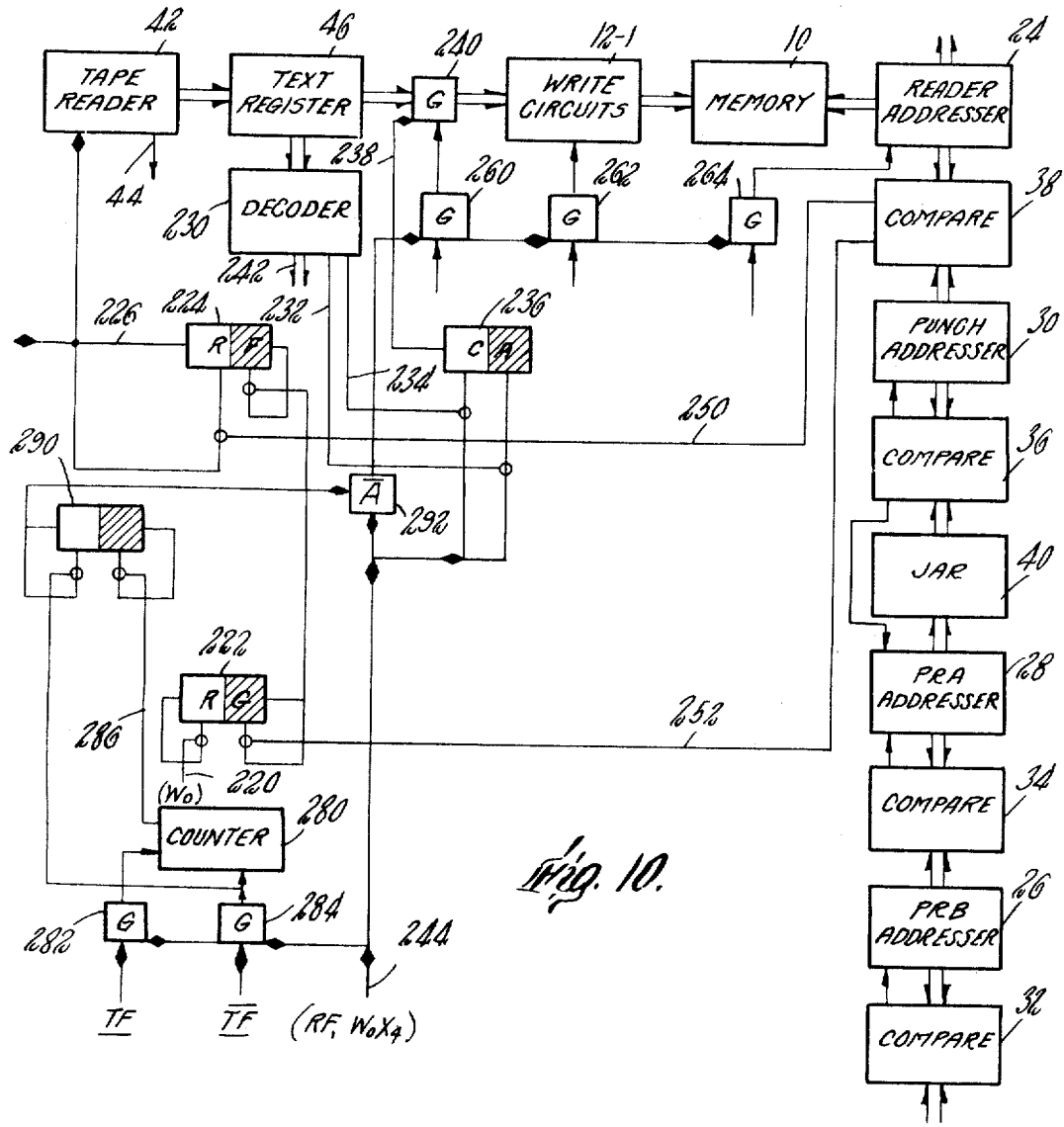

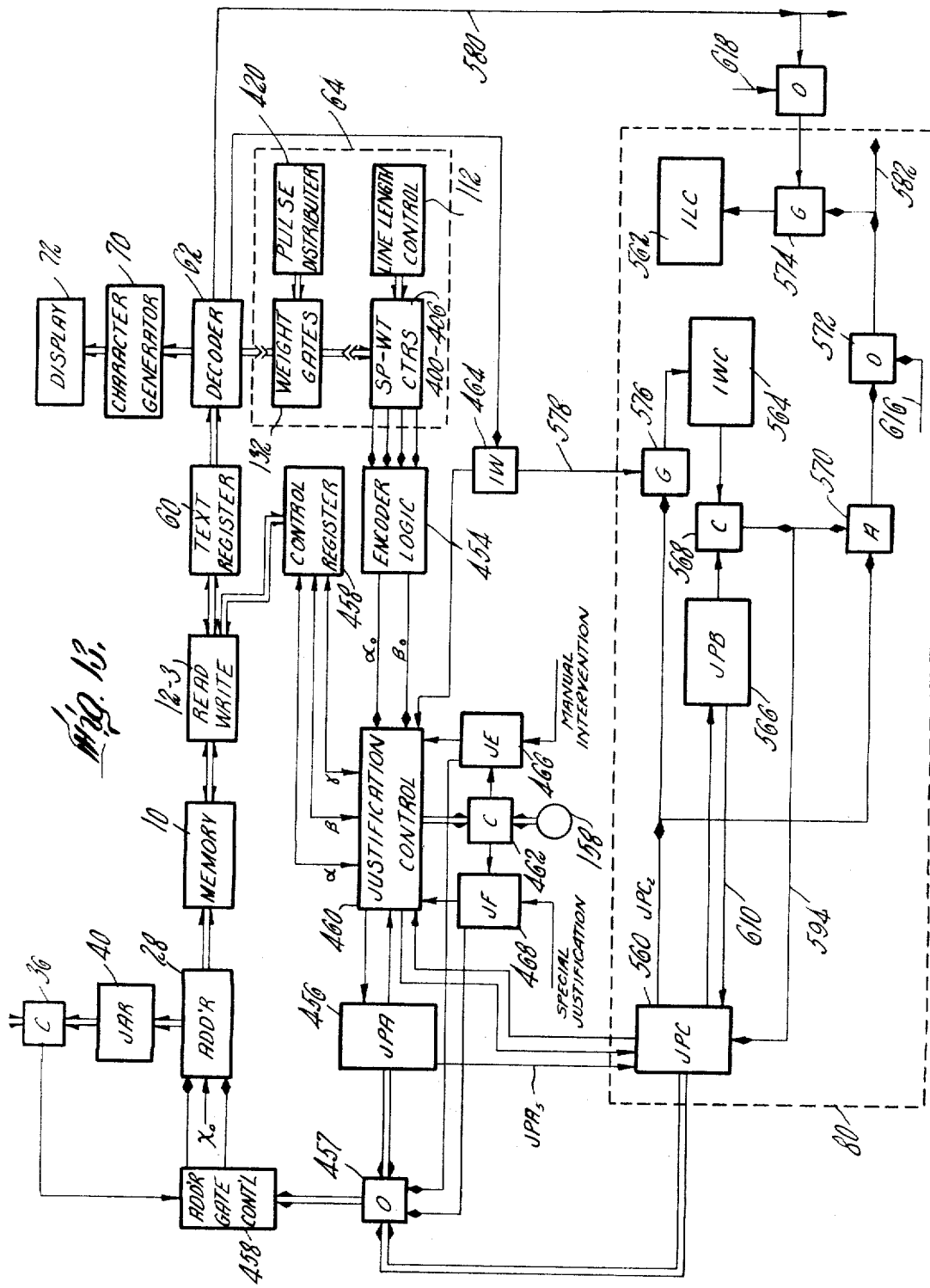

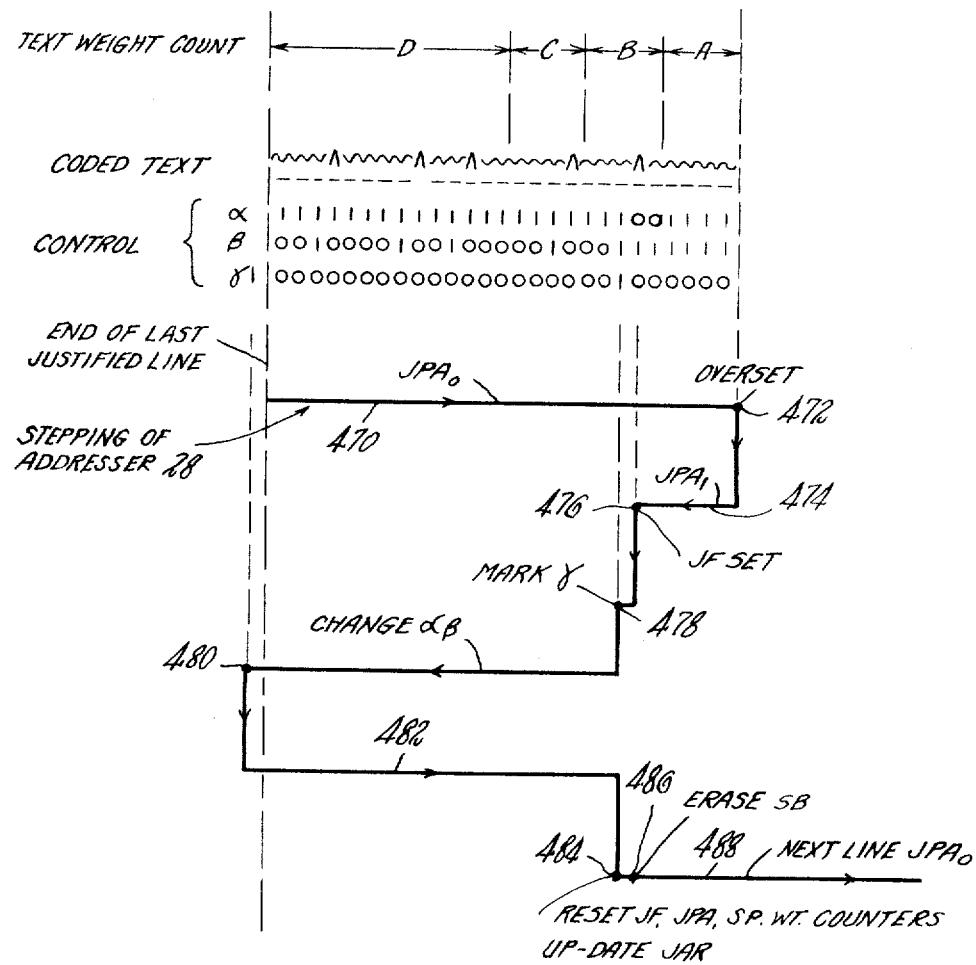

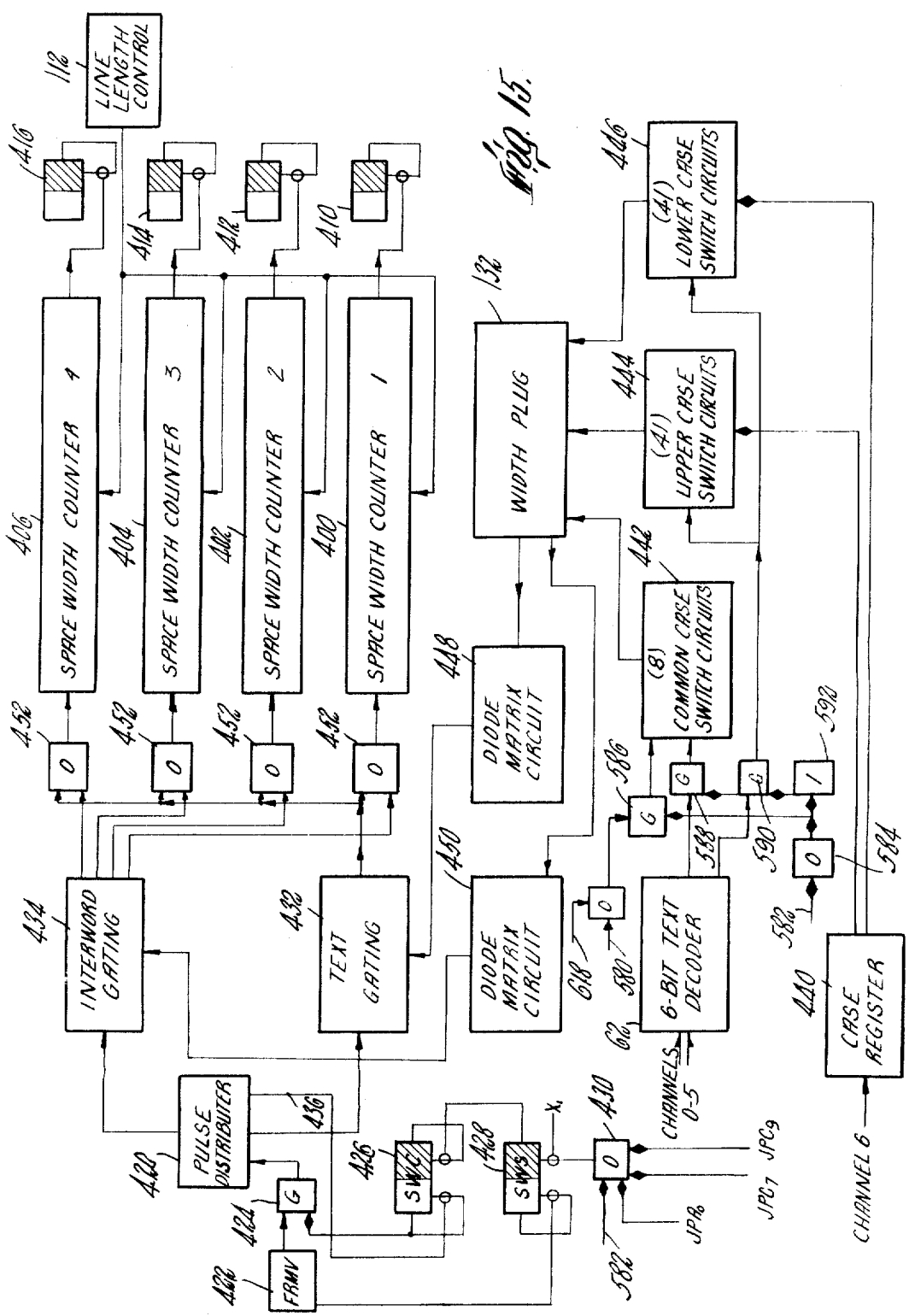

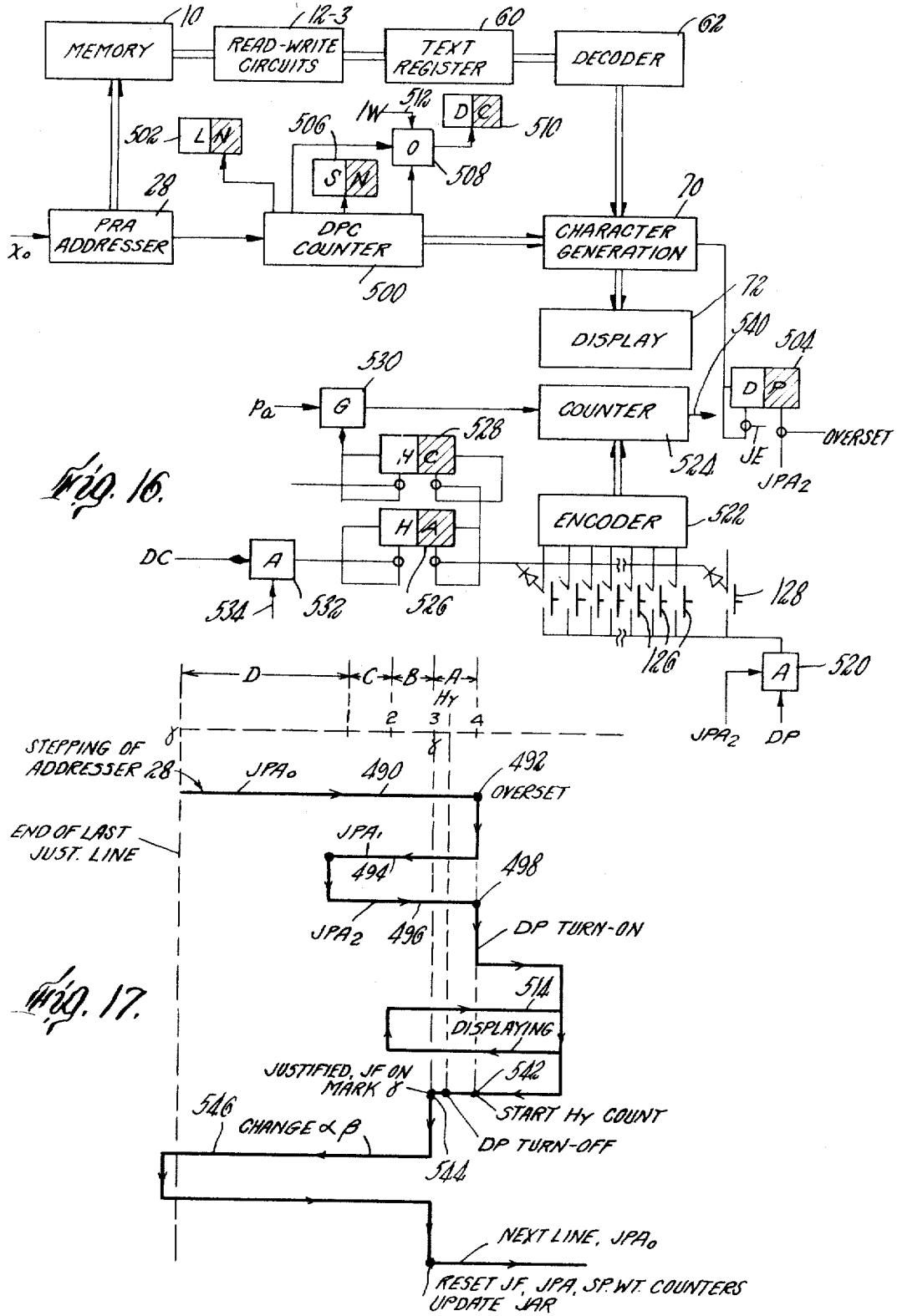

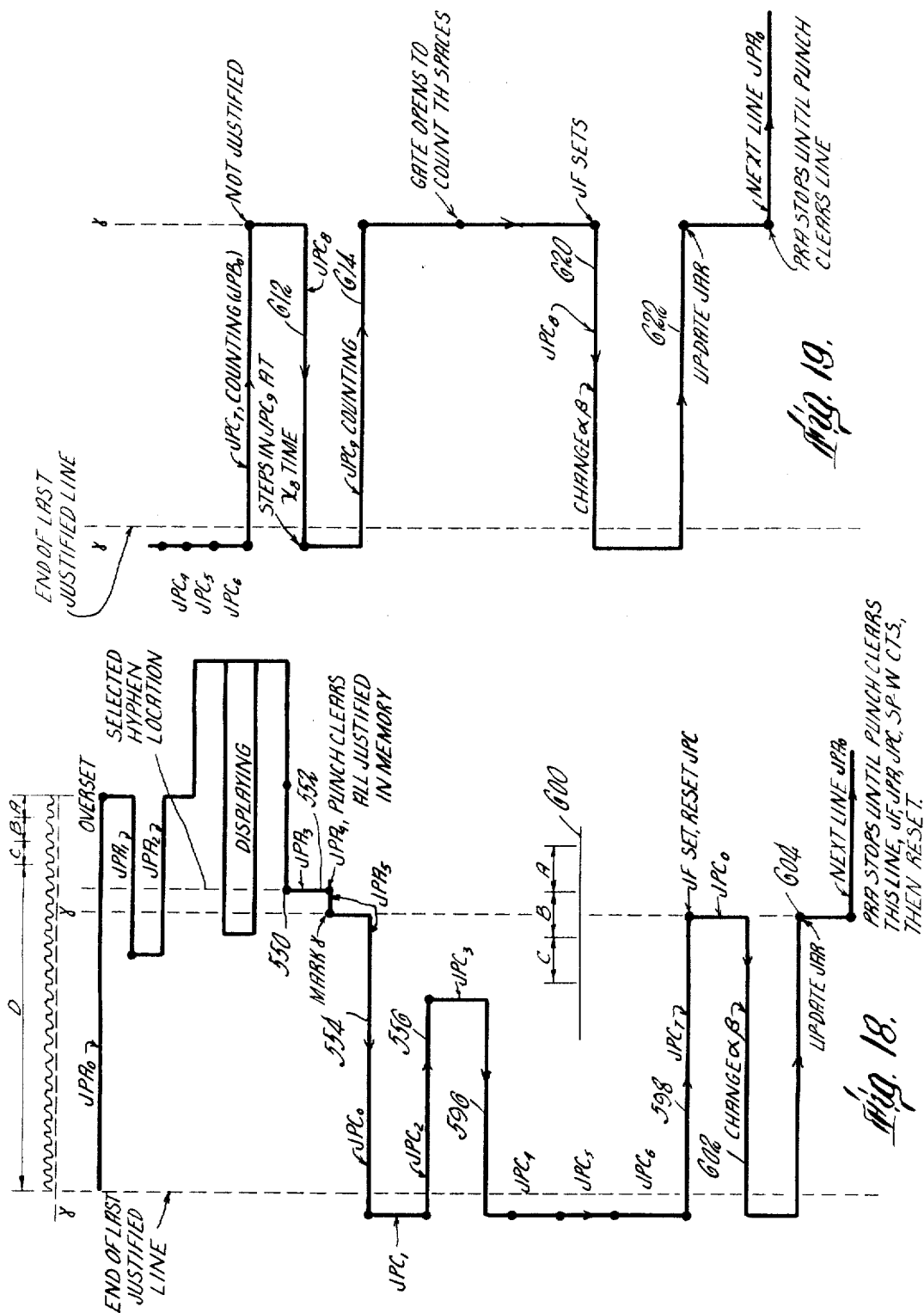

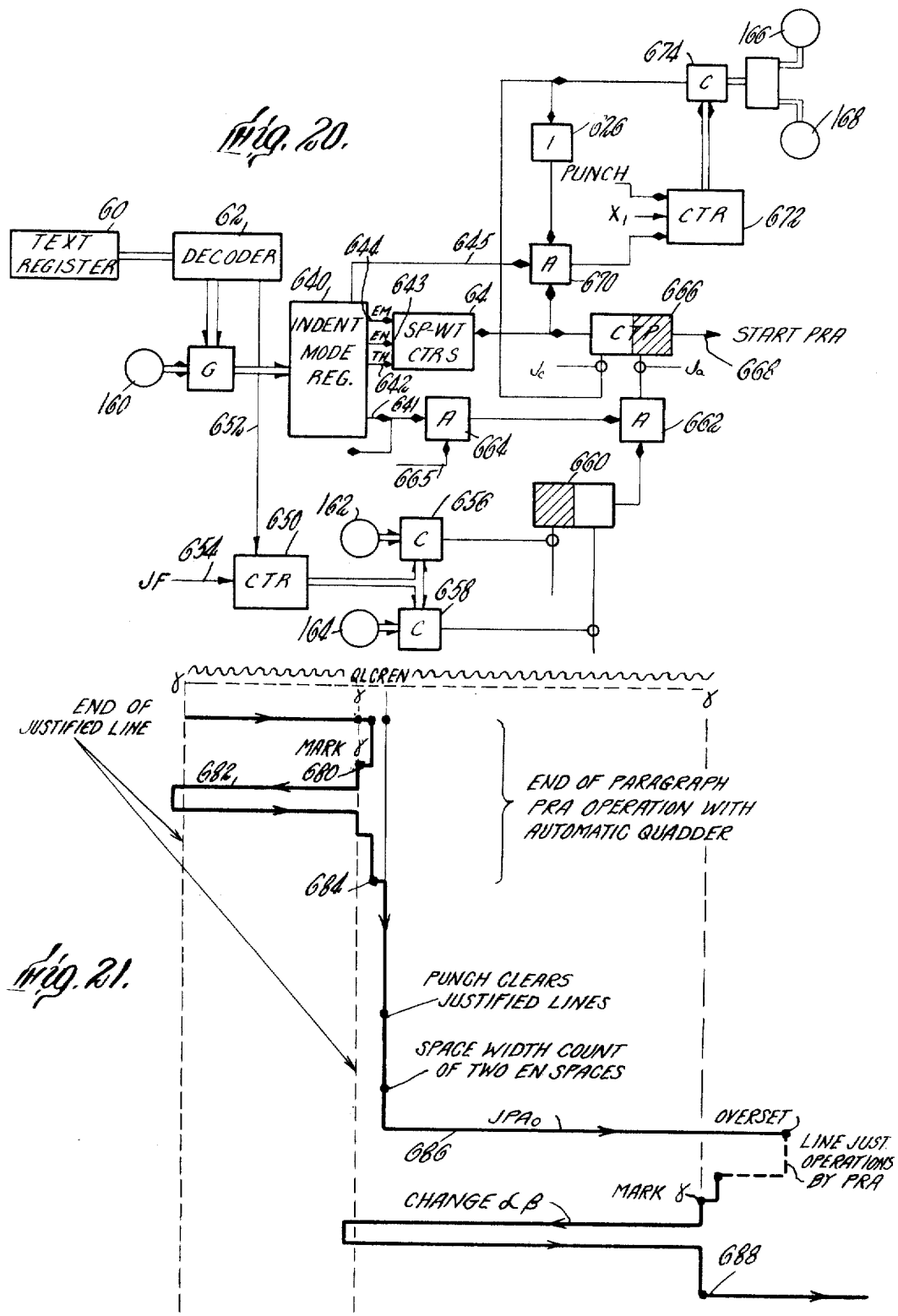

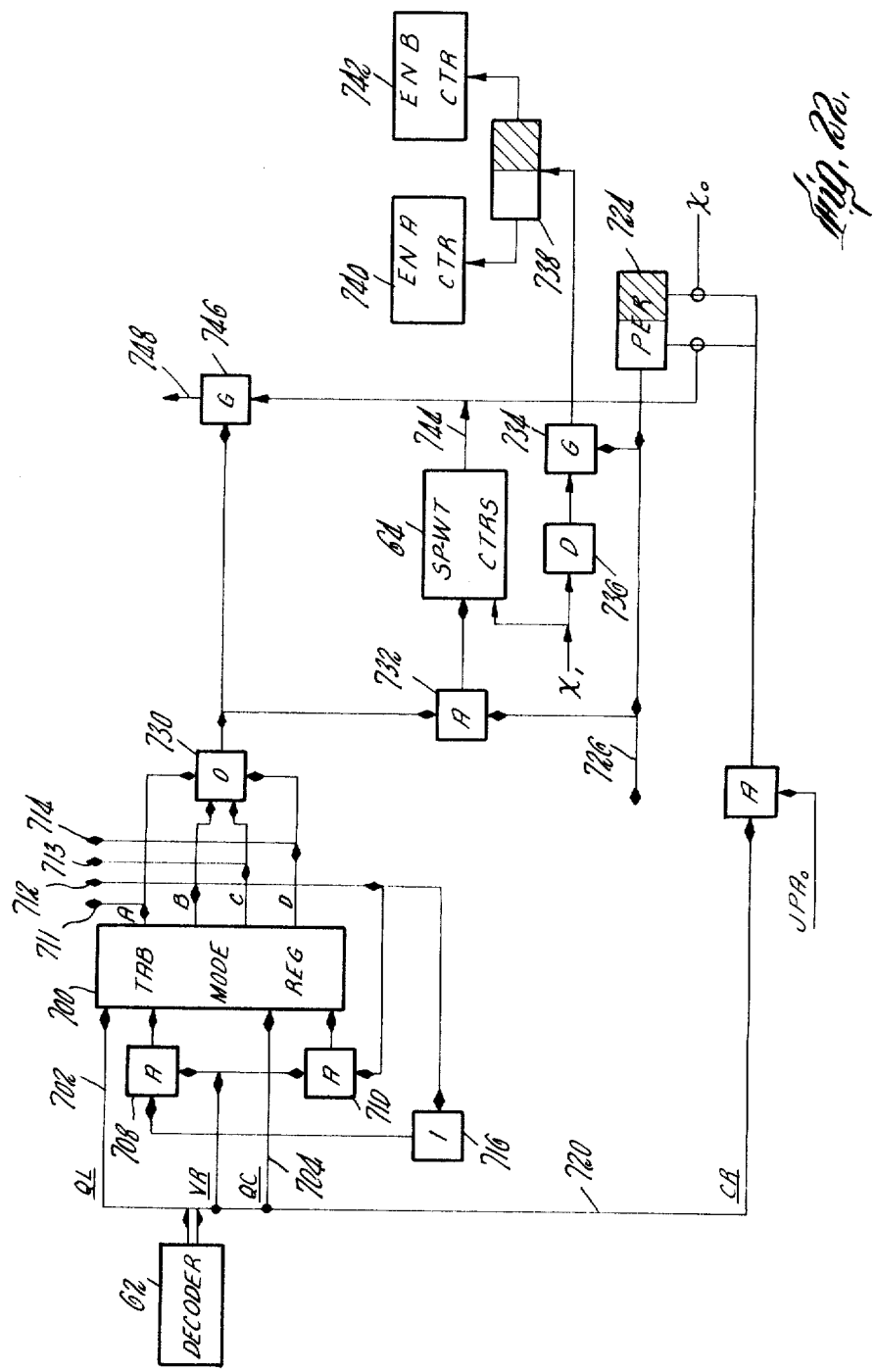

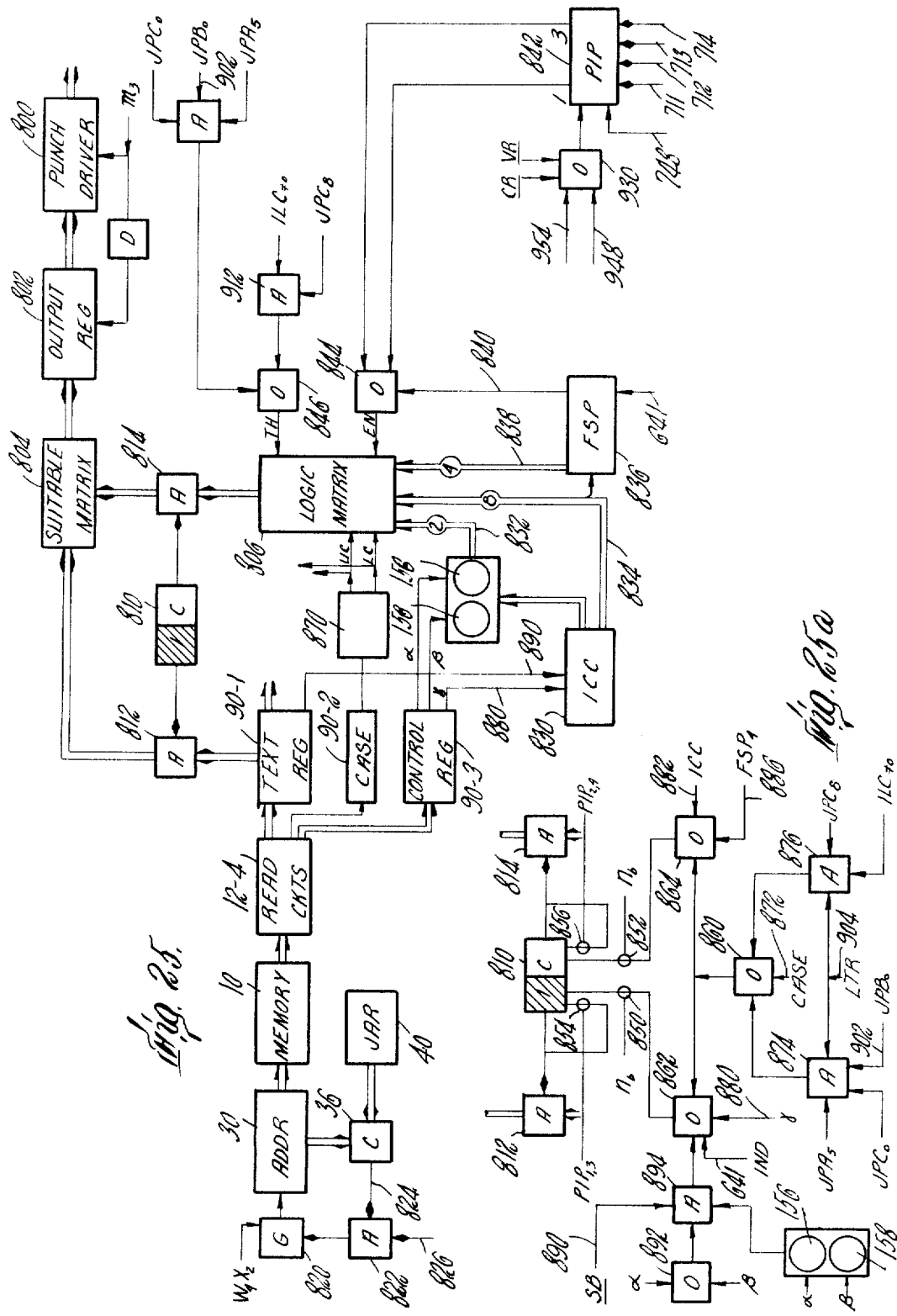

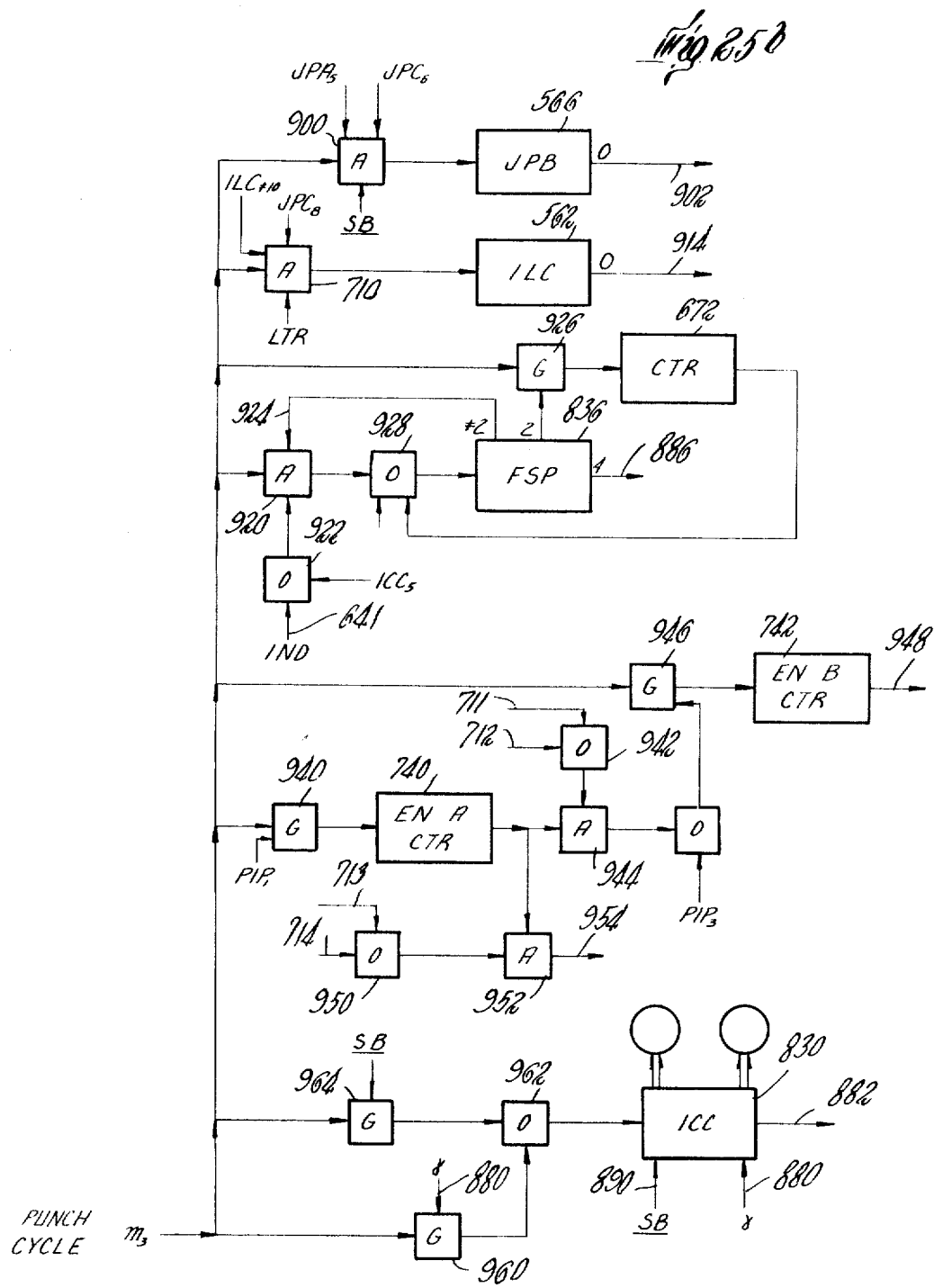

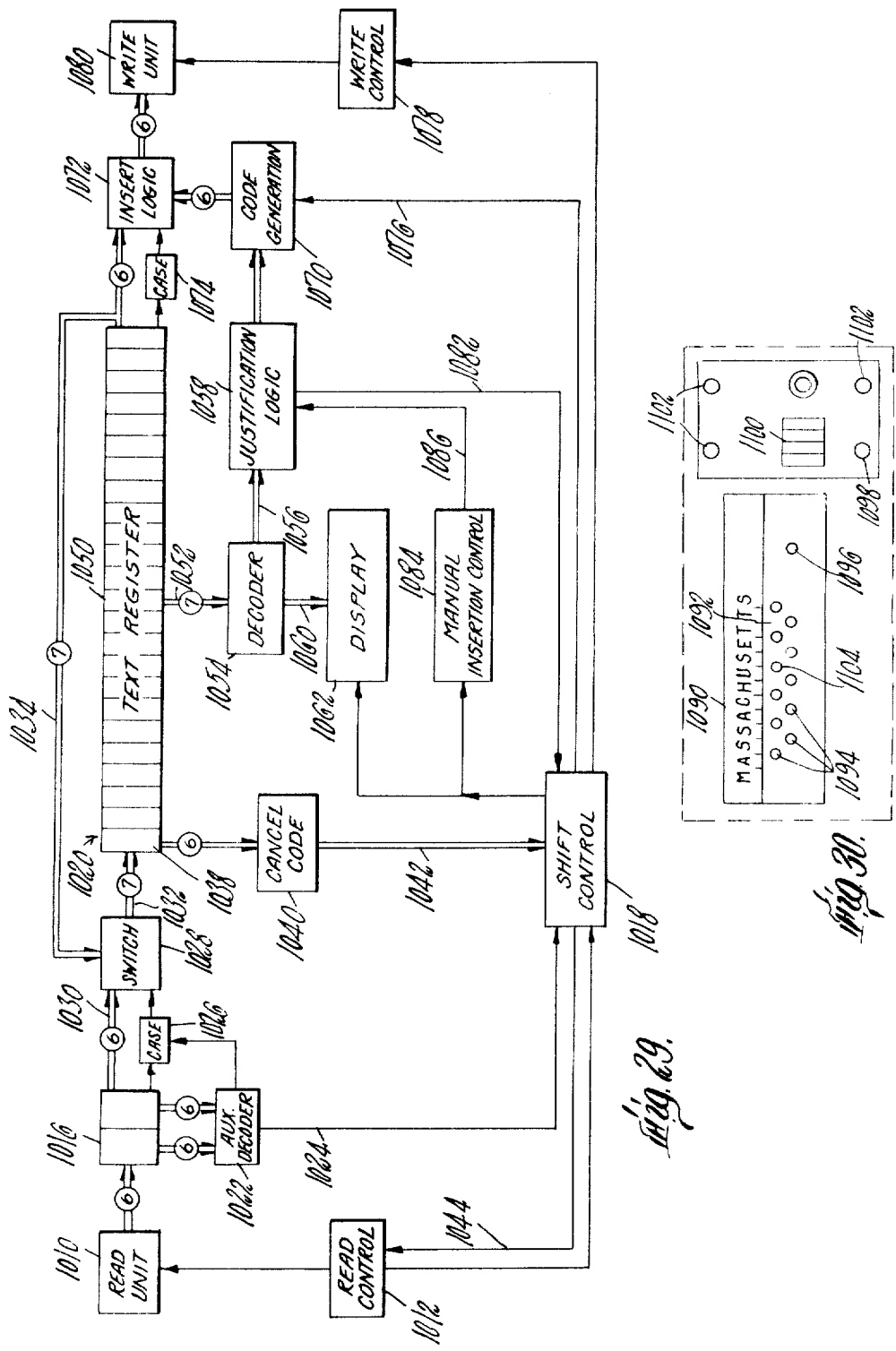

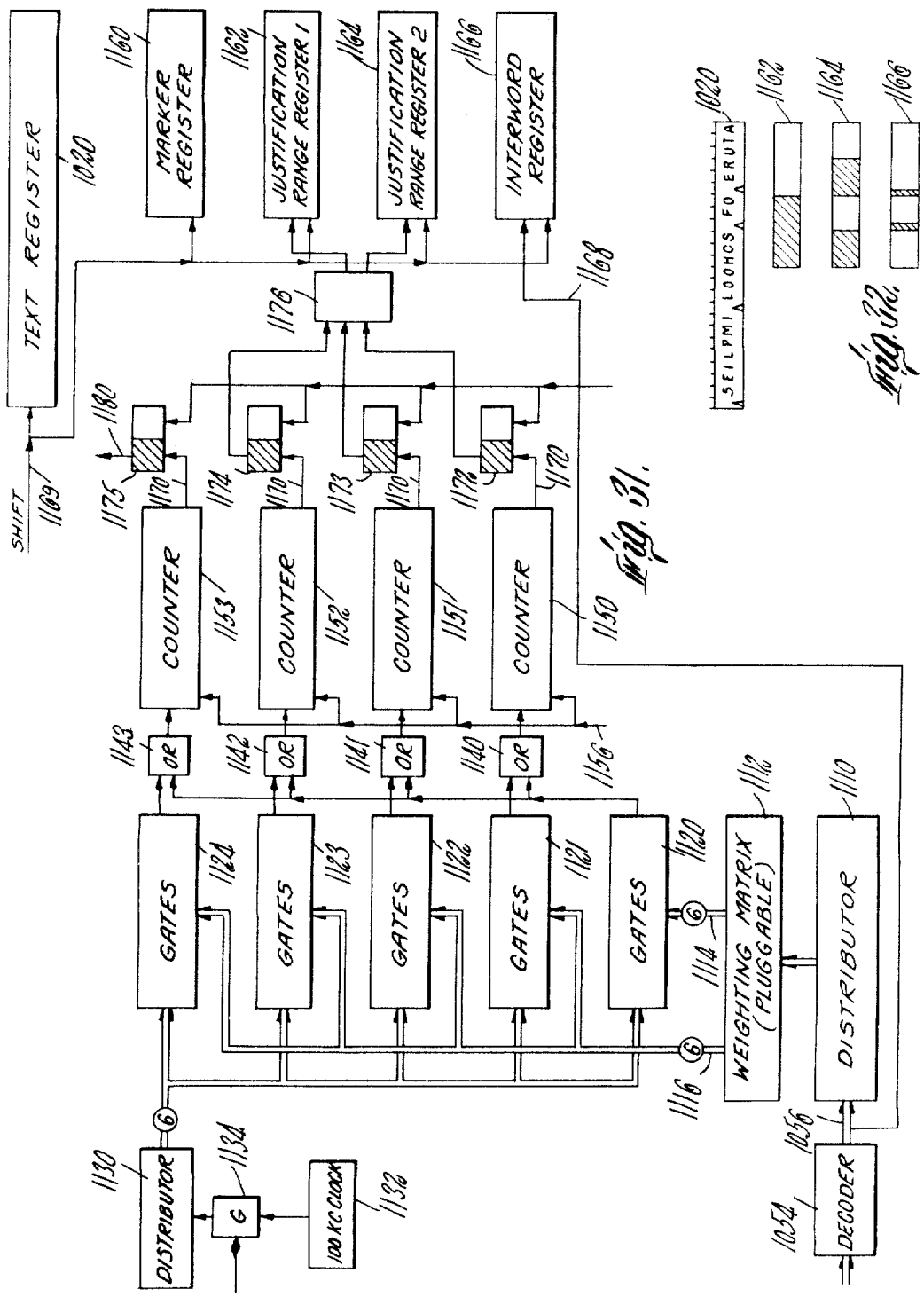

3,312,953
DATA PROCESSING SYSTEM
An Wang and Ge-Yao Chu, Lincoln, Mass., assignors to Wang Laboratories Inc., Tewksbury, Mass., a corporation of Massachusetts
Filed Oct. 29, 1964, Ser. No. 407,492
44 Claims. (Cl. 340—172.5)

This application is a continuation-in-part of our copending application Serial No. 304,804, entitled "Data Translation System" and filed August 27, 1963. This invention relates to data processing system and more particularly to serial data processing systems.

In the processing of data items it is frequently desired to translate those items from one coded interrelationship to another. Such an application for data translation equipment arises where it is desired to insert justification information in textual data for the control of line casting machines to produce type arranged in lines of correct (justified) length. The input data for such equipment typically is in the form of coded items which represent characters, spaces, and typographical operations formed into words, sentences, and paragraphs. Such coded input data may, in addition, include justification information which is to be revised. In the generation of justification information, both the nature of the type font to be employed and the desired length of line must be taken into consideration.

In order to maximize the use of the available line space, a word may be hyphenated, or the spacing of words and/or characters may be varied, or both. Due to the many possible character combinations in the typical data texts to be justified, storage capacity of the size employed in general purpose computers would be required in the translation equipment if the equipment itself was to accurately select all the points at which all possible letter combinations can be acceptably hyphenated. The provision of such storage capacity markedly increases the cost and complexity of data processing apparatus. Further, data processing of this type involves several coordinated steps which, while capable of being accomplished by a single processing unit, can be efficiently accomplished by several distinct units, each particularly assigned a specific function, provided that the processing of the same data item by the several units can be adequately coordinated. Such processing functions in the generation of justification control information include revision of the input code text to change or delete certain coded items; generation of control information as a function of an indeterminate number of coded items; and utilization of the generated control information to operate an output device.

Accordingly, it is an object of this invention to provide novel and improved data processing equipment particularly adapted to insert justification information into coded text data for use in controlling line casting machines.

A more general object of the invention is to provide novel and improved data processing apparatus for processing serially presented data items.

Another object of the invention is to provide novel and improved data processing apparatus enabling manual intervention in the data processing operation where a judgment beyond the capabilities of the processing apparatus is required.

A further object of the invention is to provide novel and improved data processing equipment which provides coordination between a plurality of data processing units.

Still another object of the invention is to provide novel and improved data processing apparatus which provides coordination between a data processing unit and associated equipment employed for manual intervention in the data processing operation.

Still another object of the invention is to provide in data translation equipment having a plurality of data processing units, coordination control for enabling those processing units to process serially presented data items in sequence without conflict between the several processing units.

Another object of the invention is to provide novel and improved data processing equipment for processing serially presented data items and coordinating generated control information with those data items.

A further object of the invention is to provide novel and improved data processing apparatus for generation of control information as a function of coded data items and control of an output device by the generated control information to process the data items.

In general, the data processing apparatus includes a plurality of processing units with each unit operating on serially presented data items and the operation of each processing unit being coordinated with the other units to avoid interference between units or redundant processing of data. Manual intervention is enabled in conjunction with a data display where the capabilities of the automatic processing sequence are exceeded and control information is generated by that means. The generated control information is coordinated with data items and controls an output unit.

In the preferred embodiments the data items are text data which are encoded on tape, for example, in a six channel teletype code and include capitalization information, punctuation information, etc., in addition to text characters. This coded input data may also include "justification" information such as "end-of-line" codes or error codes, and a processing unit revises or deletes these codes as a function of the text combinations. This data in then processed by a distinct processing unit to accumulate the weight of those coded items that affect line length. As is well known, each text character will occupy a determinable portion of line length as a function both of the nature of the type font to be employed and the character itself. For example, a lower case "i" will require a relatively short line length, a lower case "n," a greater line length, and an upper case "M," a still greater line length in a conventional type style, but those line lengths will vary from type style to type style.

To enable the apparatus to properly respond to different type styles, a pluggable "weighting" unit is operatively connected into the processing unit, which weighting unit modifies signals characteristic of a particular character weight for a predetermined type font. The coded text data is serially applied to this weighting unit to generate weight factors which are transferred to a weight accumulator unit preset to a desired line length. The accumulator assigns several different weights in response to each detected interword item so that a full line signal is generated for each of several different numbers of character. When the maximum number of characters capable of being placed in a single line have been decoded ("overset"), the processing unit automatically initiates a search to determine whether a text word ends within a permissible range from the last character in the maximum line length. In response to detection of such an interword location, justification information is associated with the series of signals which enable the generation of control information for line casting machines. These signals may be associated with the corresponding text signals, either by storage in the same word in a memory unit, or by coordinated shifting through separate memory units. This control information provides to still another processing unit (an output device) control information which enables that processing unit to instruct a line casting machine to vary the spacing of the words in a line and to control the machine at the point at which one line of text will end and the next line of text will commence.

However, should the processing unit not locate an interword within a permissible range, it may automatically interrupt the serial coded text processing operation and enable (energize) manual intervention circuitry which permits an operator to select a point at which the line should be ended, for example, at an appropriate hyphenation point. In response to the selection of that point, the processing unit generates signals for control of the output unit. To this end the manual intervention circuitry provides a display of the entire word of text which was being processed when the "overset" point was sensed by the weight accumulator. Correlated with this word display are manual intervention controls which enable the operator to either select an interword location (the beginning of the displayed word) or a hyphen location (at a point within the displayed word). This display is controlled from the serial text storage unit through the same decoder that controls the accumulation of weight information, and the manual intervention control operates the processing unit to generate justification control information in a manner similar to the automatic generation of justification control information.

The appearance of the displayed word signals the monitoring operator that the processing apparatus has encountered a situation which it is not capable of handling routinely, and all the pertinent information necessary for an operator decision is displayed in front of him. Through the selection of one of the several possible alternatives as the function of the display, the operator causes the processing unit to generate and insert suitable justification control information in the serial data train. A feedback link may be provided, together with override means, which link alerts the operator should his selection decision not satisfy pre-established criteria and also prevents the generation of control information in accord with his unacceptable request. When an acceptable decision has been made by the operator, the system disables the manual intervention apparatus and automatically resumes the data translation operation so that the justification control information is inserted in the serial data train.

The apparatus also enables further modification of the data where the capacity of the manual intervention apparatus is exceeded or to by-pass that intervention apparatus entirely. In the text justification form, this apparatus enables great variation in the spacing of text characters—to provide indentation, tabulation and even variation in spacing of characters within a word. The apparatus is flexible and may be arranged to comply with standard type setting procedures.

Where the word spacing permitted in the initial automatic processing range does not satisfy the margin requirements, the processor interrupts normal processing and inserts additional spaces (for example, between characters in the text), which additional spaces, plus the variable interword spacing, will enable the line to be properly justified. This control information, rather than being stored with each text character, is stored separately. The processor similarly can generate control information to vary the position of the margins (indentation) and to include a series of spaces within a line of text (tabulation).

The output unit selectively responds to the generated control information and the serial data train to insert in the serial text spacing signals and other controls such as end-of-line signals so that line casting equipment in response to the resulting serial data train will set type in justified lines directly from the output tape.

While the data translation system of the invention has particular utility in generating justification control information for use in the control of line casting machines, it will be obvious that its utility is not limited to such application. Also, further objects, features and advantages of the invention will be seen as the following detailed description of embodiments thereof progresses, in conjunction with the drawings, in which:

FIG. 3 is a block diagram of the data processing system shown in FIG. 1, showing greater detail;

Figure 7:
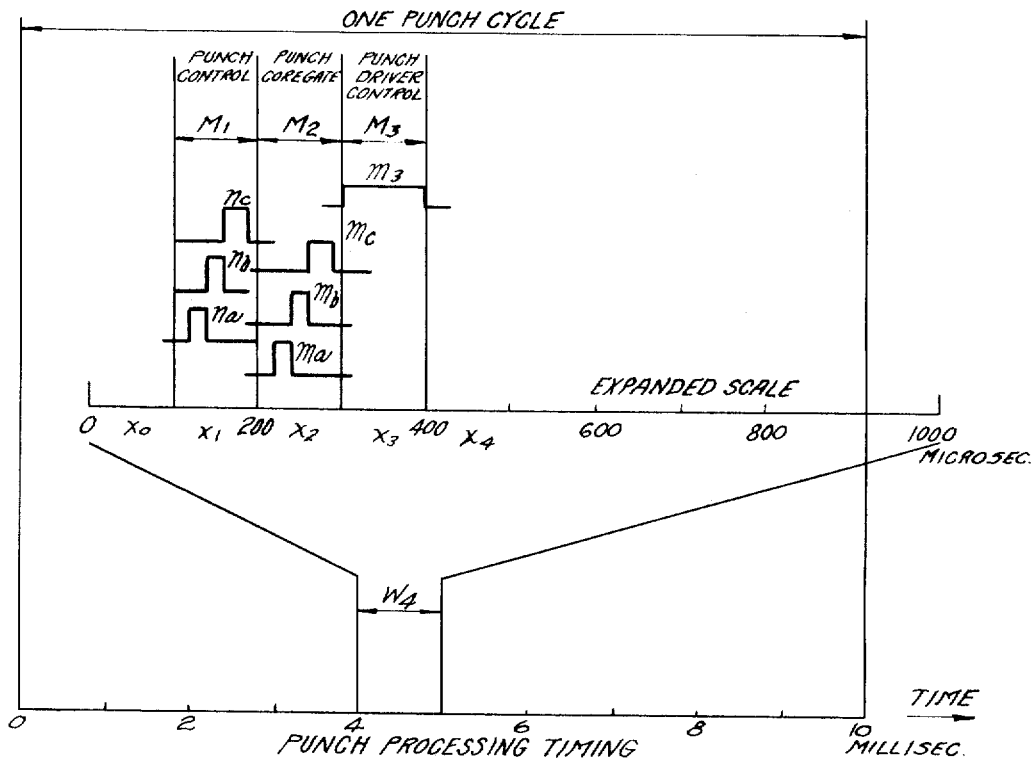
Figure 8:
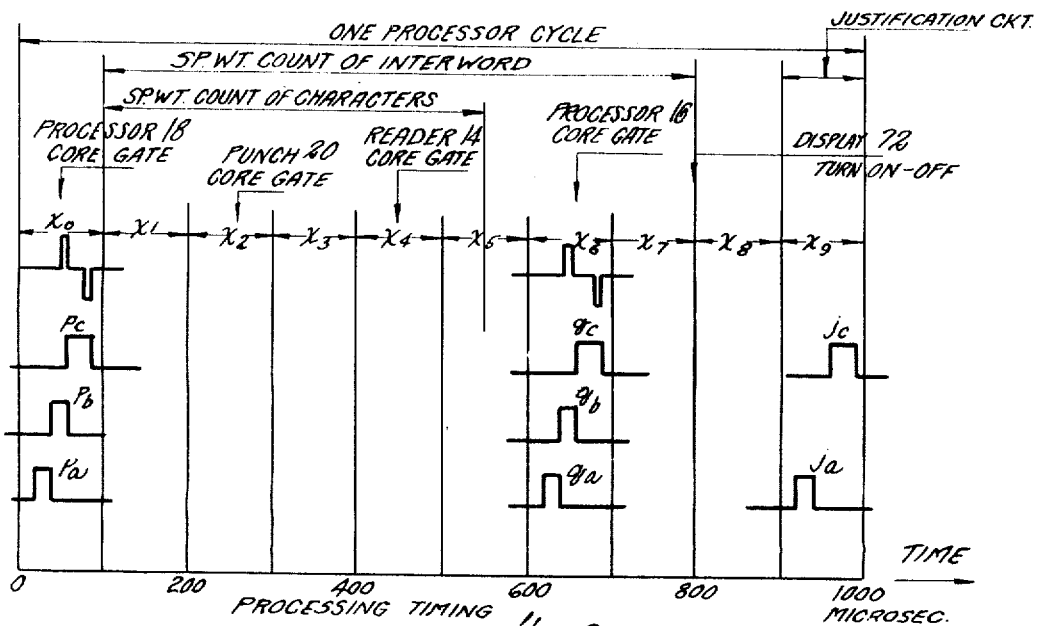
Figure 11:
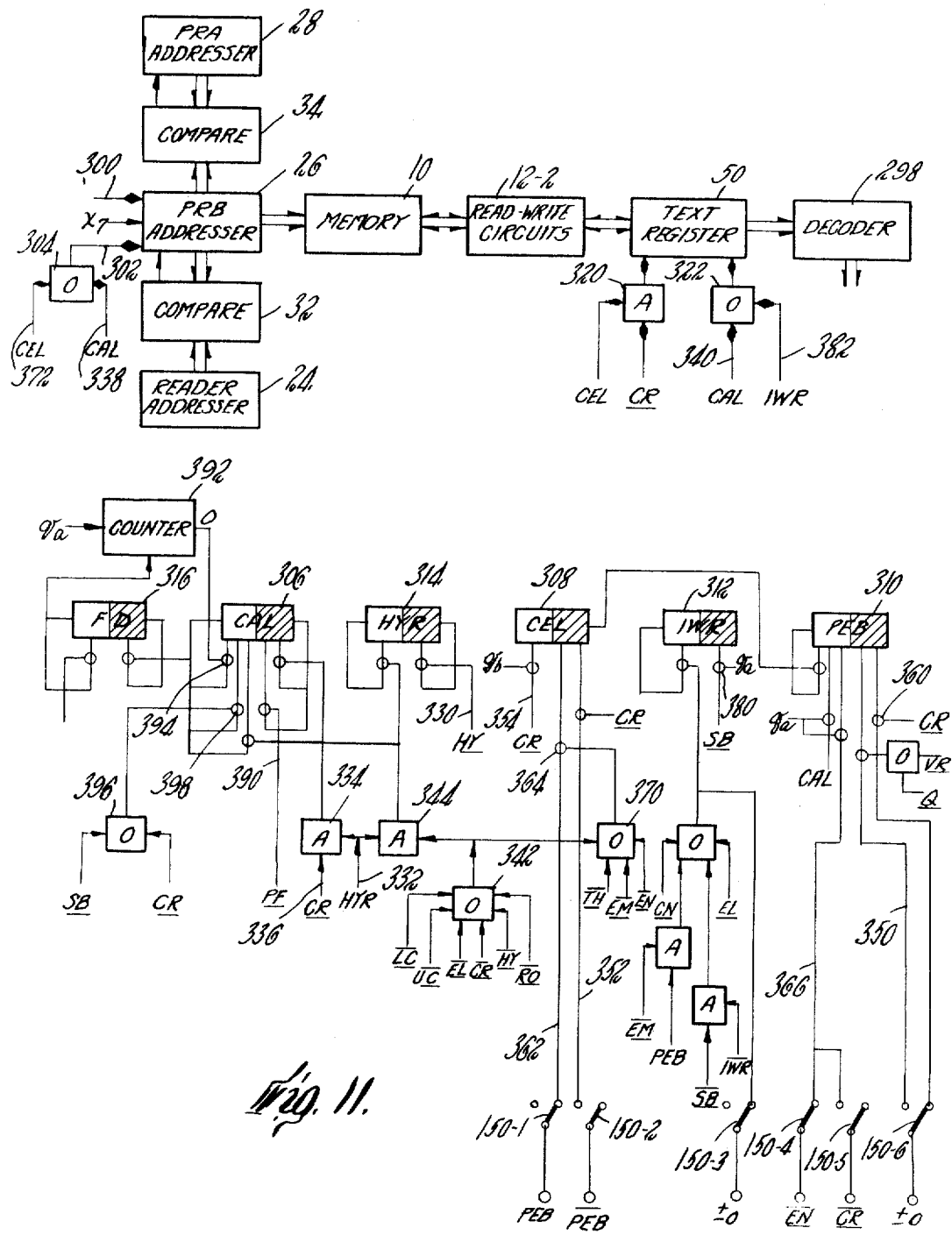
Figure 12:
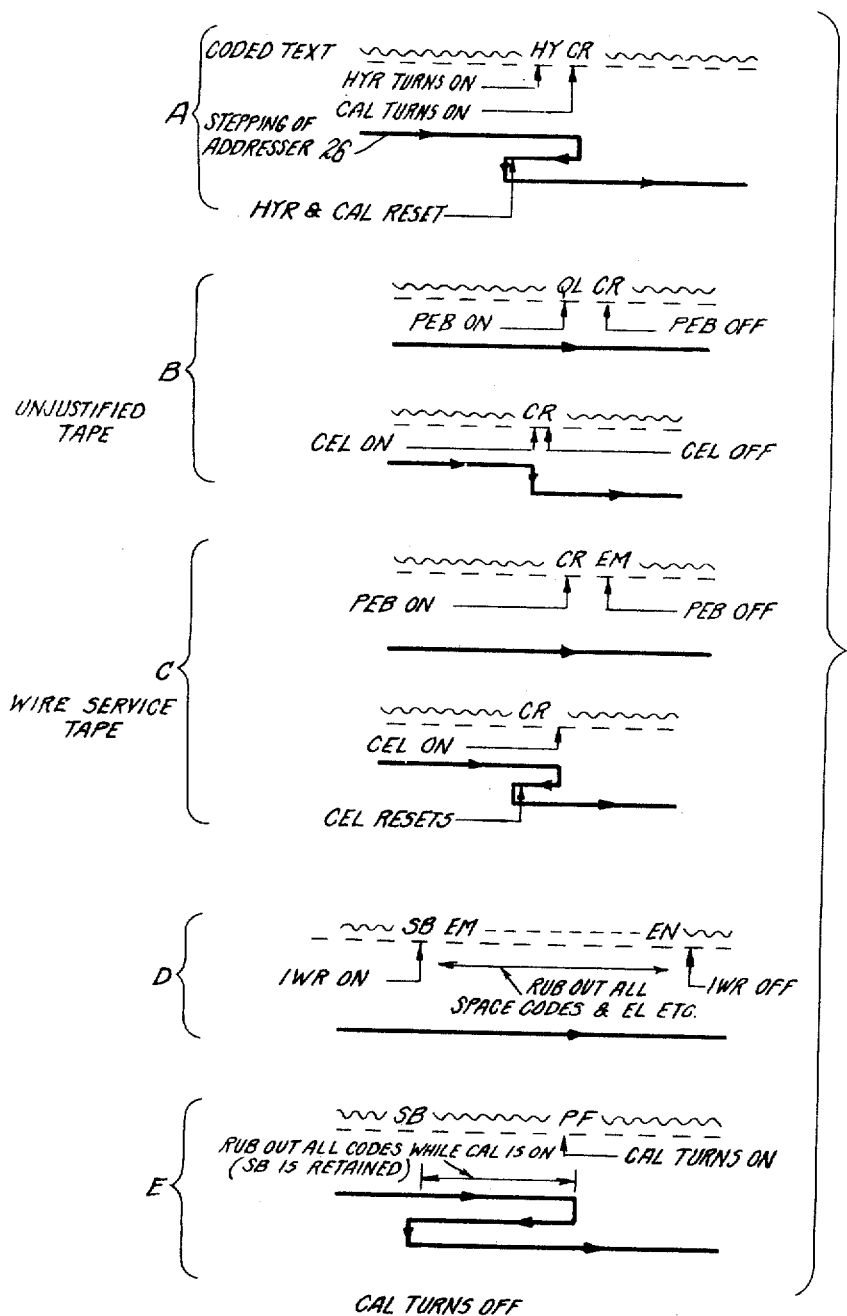
Figure 23:
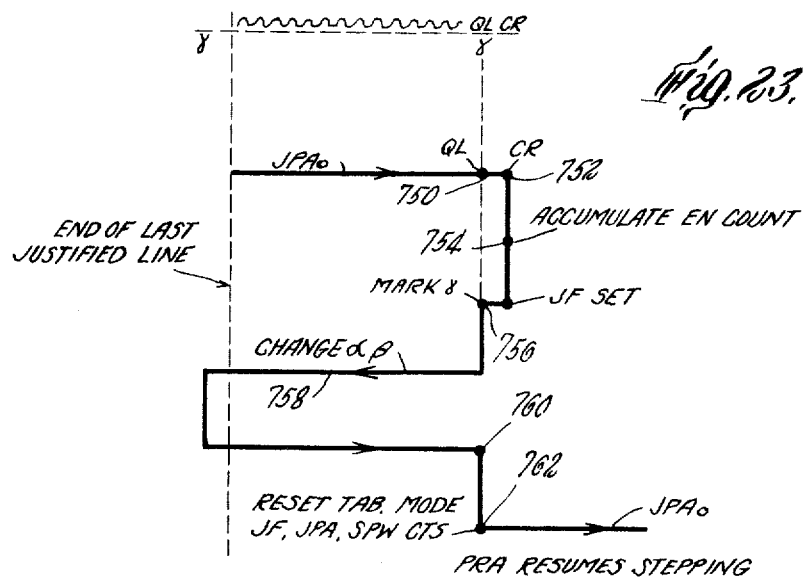
Figure 24:
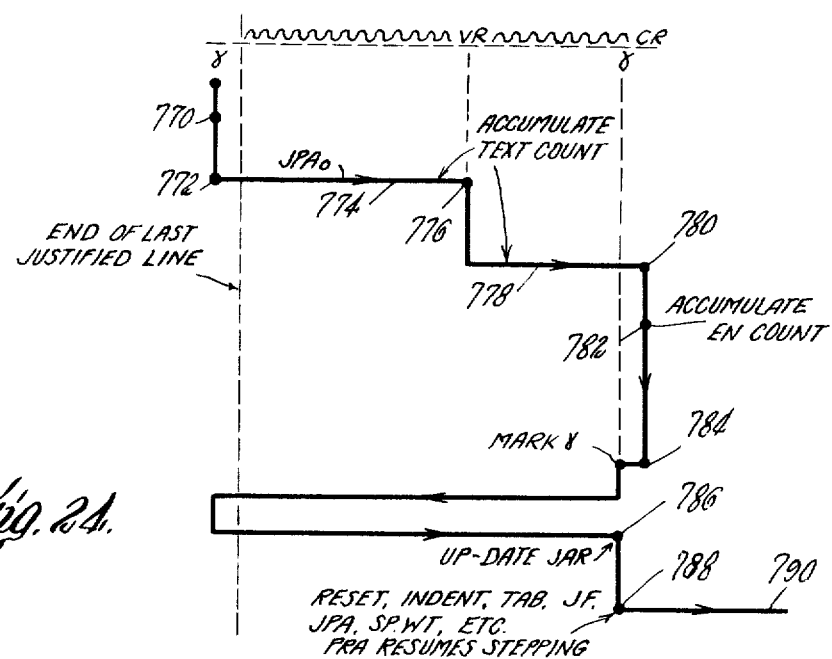
Figure 26:
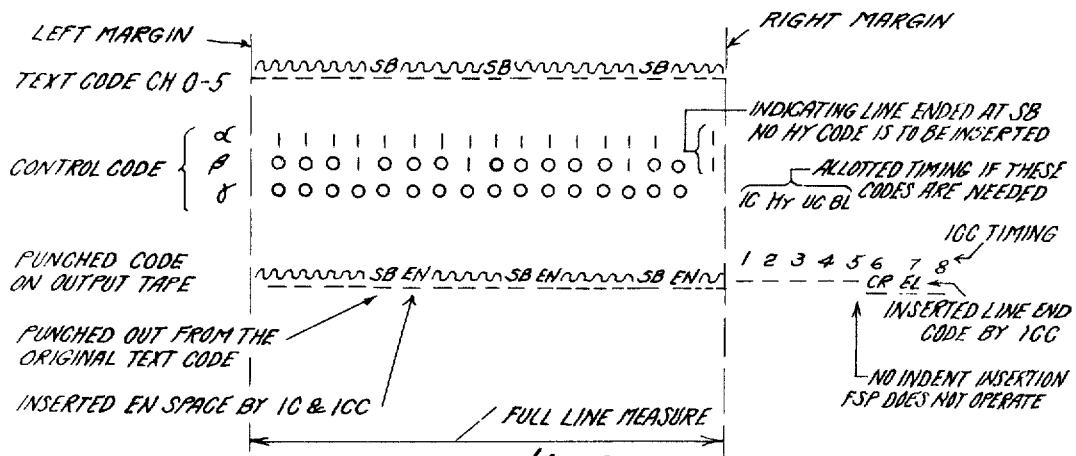
Figure 27:
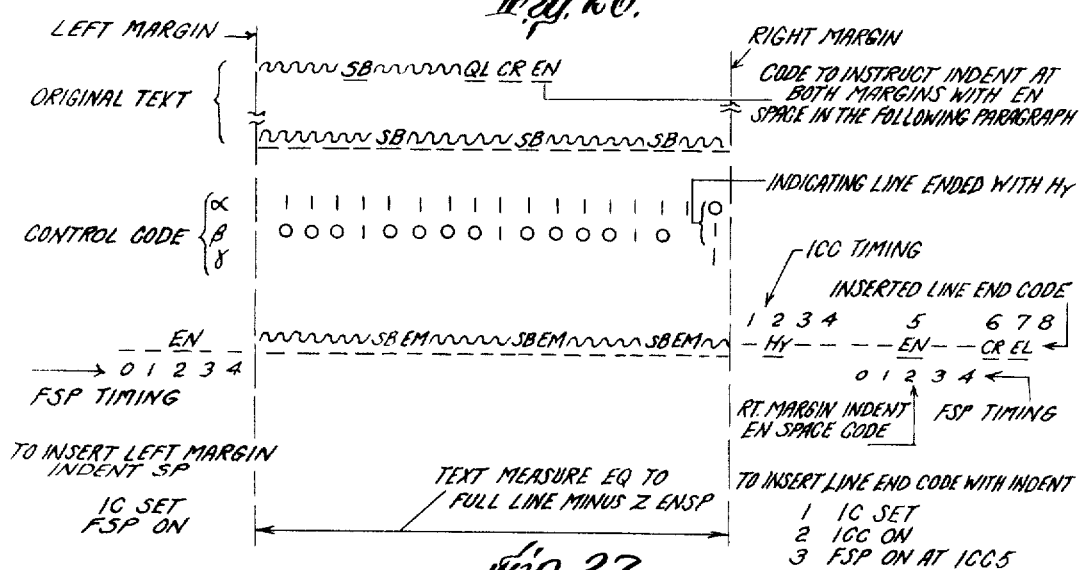
Figure 28:
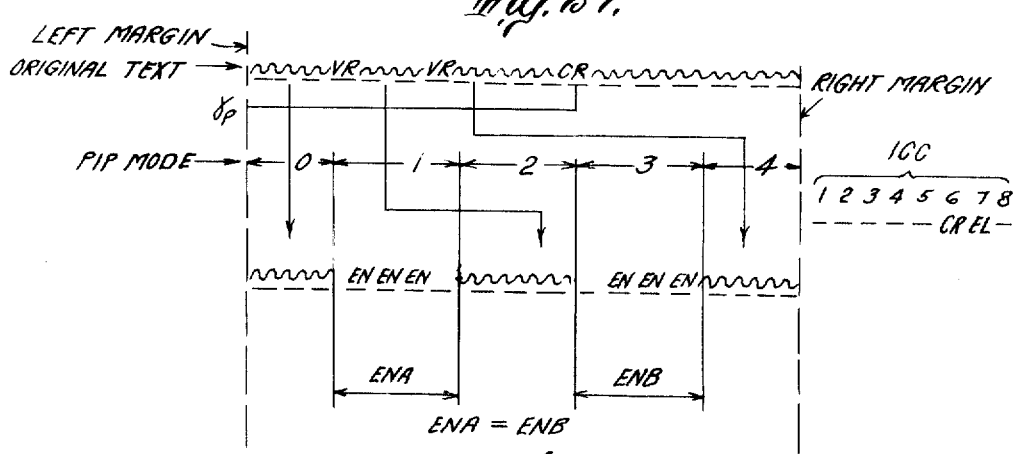
Figure 33:
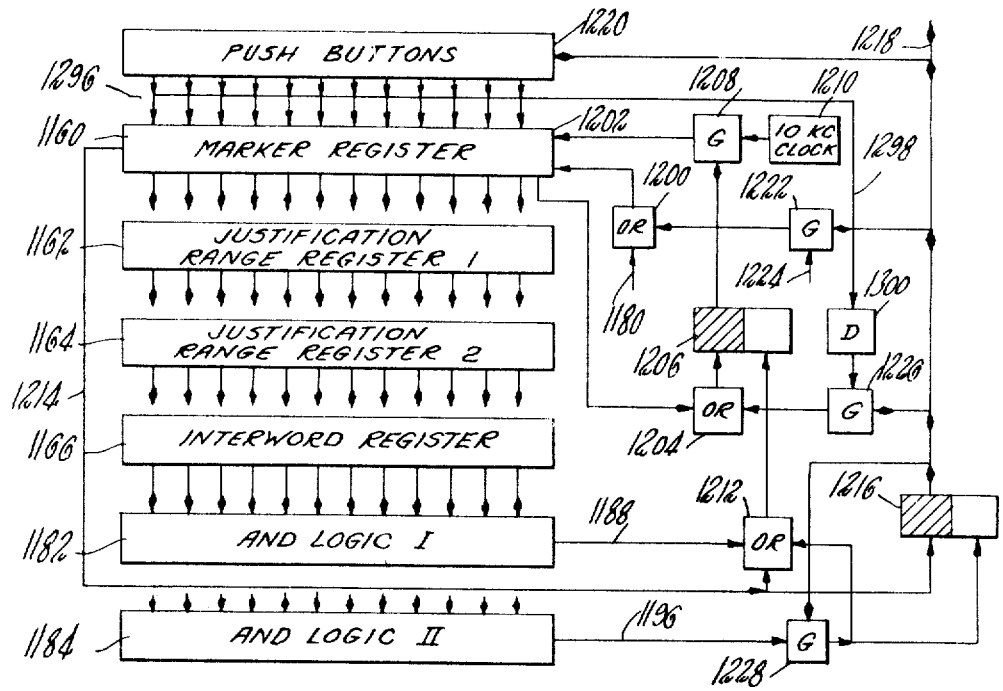
Figure 34:
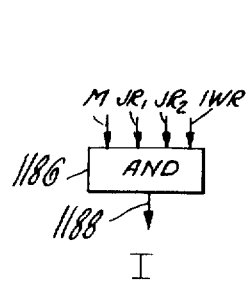
Figure 35:
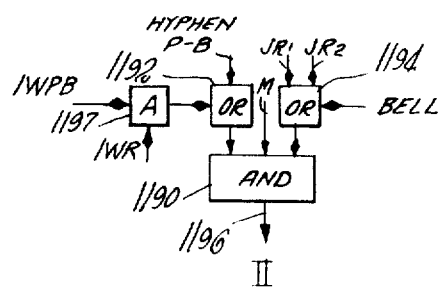
Figure 36:
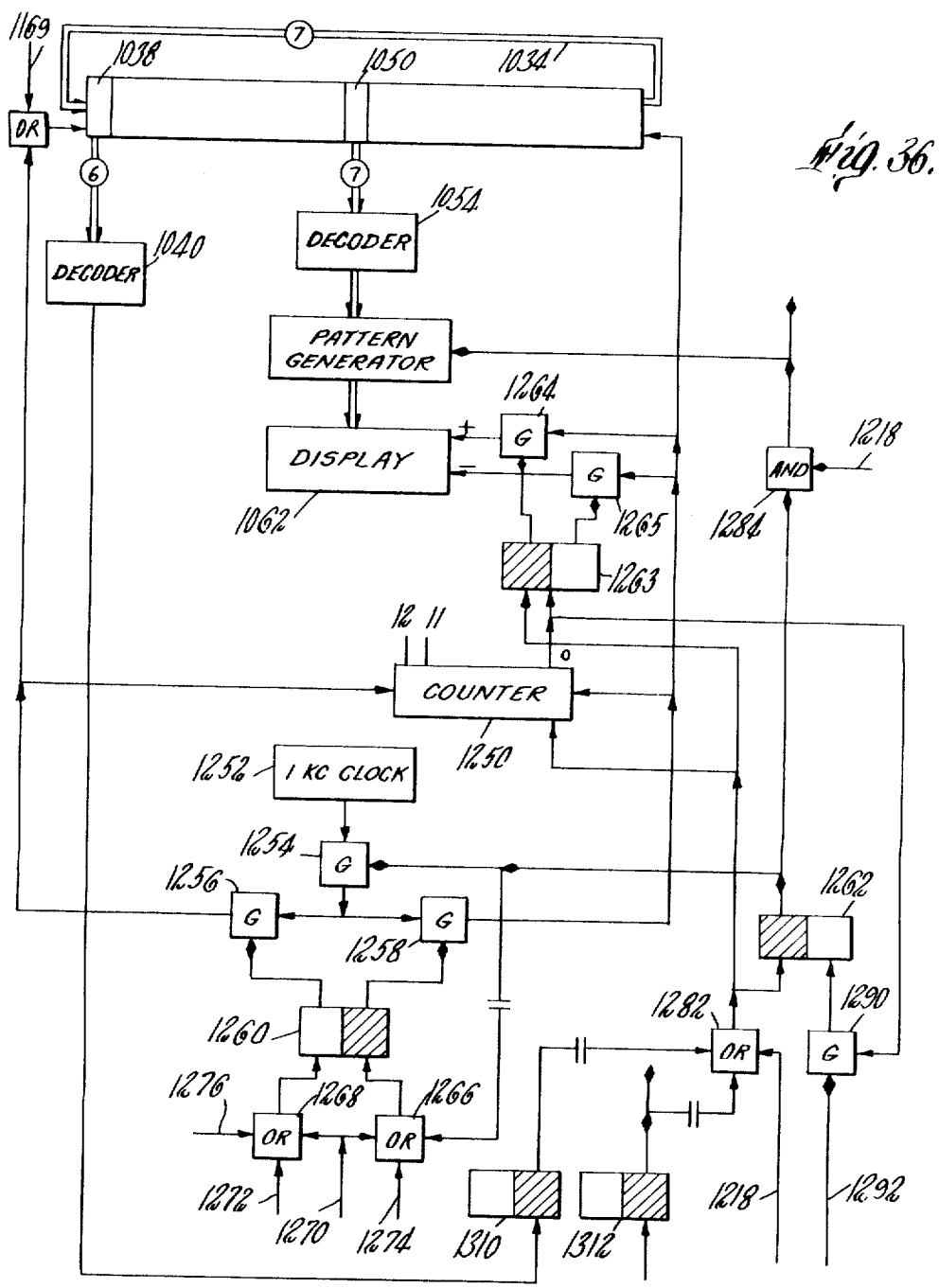

FIGS. 7 and 8 are timing diagrams indicating the timing of the output unit 20 and of the processers 16 and 18, respectively;

FIG. 9 is a diagram indicating relative positions of the several processing units with respect to addresses of memory 10;

FIG. 10 is a block diagram showing features of the input unit 14;

FIG. 11 is a block diagram showing features of the processer unit 16;

FIG. 12 is a series of routing diagrams indicating several different types of operation of processer unit 16;

FIG. 13 is a block diagram of portions of processer unit 18;

FIG. 14 is a routing diagram indicating the nature of one mode of operation of processer unit 18;

FIG. 15 is a block diagram of the space width counter circuitry 64;

FIG. 16 is a logical block diagram of the manual intervention and associated display circuitry;

FIG. 17 is a routing diagram indicating the mode of operation of processer unit 18 in conjunction with utilization of the manual intervention controls;

FIGS. 18 and 19 are routing diagrams indicating modes of operation of processer unit 18 with utilization of special justification circuitry 80;

FIG. 20 is a logical block diagram of the indentation circuitry 82;

FIG. 21 is a routing diagram indicating a mode of operation of processer unit 18 with the indentation circuitry;

FIG. 22 is a logical block diagram of the tabulation circuitry 84;

FIGS. 23 and 24 are routing diagrams indicating modes of operation of the processer unit 18 with the tabulation circuitry;

FIGS. 25, 25a and 25b are logical block diagrams of the output unit 20;

FIGS. 26–28 are diagrams indicating modes of operation of output unit 20;

FIG. 29 is a block diagram of a second embodiment of the invention that utilizes a shift register as a principal data storage component;

FIG. 30 is a view of the display and control associated with the manual intervention console employed with the apparatus of FIG. 29;

FIG. 31 is a block diagram of the justification logic including character weighting and line weight accumulator units employed with the apparatus of FIG. 29;

FIG. 32 is a diagram of illustrative contents of justification logic registers shown in FIG. 31;

FIG. 33 is a logical block diagram showing features of the automatic justification information signal generating portion of the justification logic employed with the apparatus of FIG. 29;

FIGS. 34 and 35 are logical block diagrams of a stage of the AND logic units employed in the apparatus shown in FIG. 33, and FIG. 36 is a logical block diagram of the display control apparatus employed for manual intervention purposes in the apparatus of FIG. 29.

GENERAL DESCRIPTION

Figure 1:
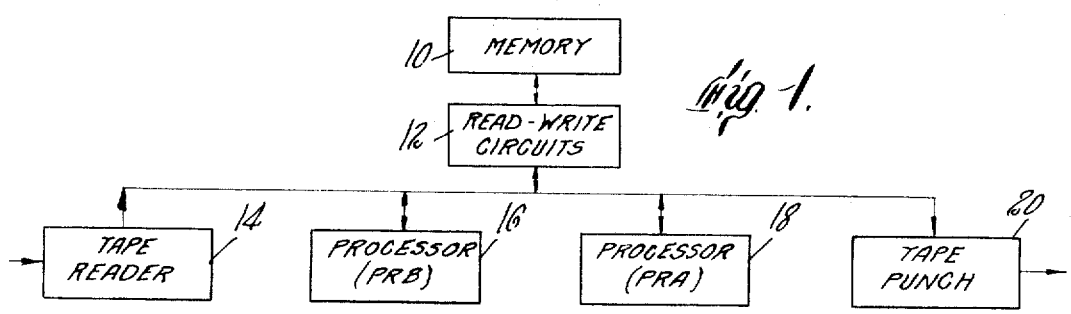
FIG. 1 is a basic block diagram of one embodiment of data translating apparatus constructed in accordance with the invention for translating coded signals representative of textual information into modified coded signals that include justification information for use in the control of line casting machines.

FIGS. 1 and 3 are logical block diagrams of the data translating apparatus constructed in accordance with the invention. This apparatus includes a serial data storage means in the form of memory 10 to which four processing units are connected through read-write circuits 12. These processing units are a data input device in the form of tape reader 14, a first processor (PRB) 16, a second processer (PRA) 18, and an output device in the form of tape punch 20. Input data is fed into reader 14 for storage in memory 10; revised as necessary by processor 16, and then serially operated on by processor 18 in an accumulation operation to generate control information which is stored with each data character as a function of the input data for controlling the the output device 20. Additional control information may be stored by auxiliary equipment associated with processor 18. Output device 20 utilizes both the control information stored with the data character and the auxiliary control information to incorporate in the data train for suitable storage, as on a tape, correlated control information and data characters that enable the control of type setting equipment.

Figure 2:
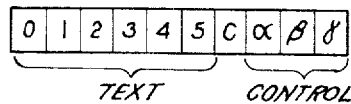
FIG. 2 is a diagram of the format of the coded data word utilized by the apparatus shown in FIG. 1.

The input data in the form of a six-channel code is fed into the input device 14. Memory 10 has the capacity for storing two hundred twenty-five (15×15) ten-bit words. Six bits (0–5) are employed for text storage, and the four additional bits are used for control, a case bit (6) and three control bits designated alpha, beta and gamma (7–9). The word format is indicated in FIG. 2.

As indicted in FIG. 1, access to memory is through common read-write circuits 12 that are time shared under the control of central clock 22 indicated in FIG. 3. The basic timing of the data processing units is synchronized with the reader 14, but when the reader is not providing timing signals, independent means for generating timing signals from the central clock are provided.

Access to memory 10 by the four units is controlled by addressers associated with each processing unit, addresser 24 controlling the write circuits 12–1 for the reader 14, addresser 26 controlling the read-write circuits 12–2 for processor 16, addresser 28 controlling the read-write circuits 12–3 for processor 18, and addresser 30 controlling the read circuits 12–4 for the output punch 20. Coordination of access of the several processing units to memory 10 is provided by compare circuits 32, 34, 36, and 38. Compare circuit 32 is connected between addressers 24 and 26 and stops processer addresser 26 when it is approaching reader addresser 24 too closely. Similarly, compare circuit 34 controls addresser 28 relative to its position with respect to addresser 26. Addresser 28 controls a justification address register (JAR) 40 and transfers the address of the end of each justified line of data to register 40. Finally, compare circuit 38 compares the addresses of reader 14 and the punch 20 prevents the reader 14 from utilizing a memory address from which data has not been read by the punch 20.

Data is applied to a tape reader 42, and the system is synchronized with this input data by initiating a cycle each time a hole is sensed in the input tape and applying a signal over line 44 in the central clock which then sequences the system through a processing cycle. The input data is applied to text register 46 and from that register channelled through write circuits 12–1 for writing in the address specified by addresser 24 in response to the time period alloted for writing access to memory by the input unit 14. In this unit, also, case information accompanying the text data as a change of case character (from upper case to lower case or vice versa) is translated to a case signal which is stored in channel 6 with the six bits of each character so that the case of each character will be immediately available to processor 18.

Each entered group of data is then processed by the processor 16 as addresser 26 operates read-write circuits 12–2 to read out each text character from memory 10 for storage in text register 50. Code revision circuit 52 operates to control addresser 26 and to change certain codes in the entered data, for example, to delete unnecessary or inaccurate control information previously inserted in the input data (for example, justification information for a different setting of type) and to revise certain codes so that the data may be expeditiously processed by processer 18.

The processer 18 then reads data words from memory 10 in the same sequence and manner as the other two processers. Data is extracted from each memory address as controlled by addresser 28. The data word is read from memory 10 through read-write circuits 12–3 and stored in text register 60 for application to decoder 62. Initially a space width count is performed by counters 64 on each data item read out of memory, and the justification circuit 66 in response to a pre-established line length operates to insert control information correlated with the data item into the alpha, beta, and gamma bits of the word which is returned to the memory address specified by addresser 28 from which the data item was withdrawn. When a line has been justified, the address of the line end is transferred to justification address register 40. Until the line is justified, addresser 28 has access to all data items between the end of the previously justified line and those that have been processed by processer 16.

If the justification circuitry 66 cannot complete a justification operation within pre-established criteria (which are manually variable), the manual intervention circuit is energized to display the portion of the data line adjacent the "overset" point and enable the operator (O) to select an end of line point, which end of line point may be either a word end of a hyphenation point. This manual intervention facility enables data lines to be ended accurately without tremendous storage capacity for all possible letter combinations or storage capacity for arbitrary rules which occasionally result in inaccurate line ends, while maximizing the number of data items that may be properly placed in a justified line. This manual intervention circuitry includes a character generator 70 coupled to the decoder 62, a display unit 72, and manual intervention controls 74 which are operated by the operator (O).

While substantial flexibility is provided by those controls by which control information is stored in each data item, the operator may select a line end point outside of the pre-established criteria and for that purpose special justification circuitry 80 is provided which provides auxiliary control information to the output device 20 (for special letter spacing) in the case where unusual conditions exist for line justification. In addition, indentation controls 82 are provided which enable the data line being processed to include indentation at one or both margins, and tabulation controls 84 enable the data line to be separated into a plurality of columns.

After a line has been justified, its address is transferred to justification address register 40 and the output unit 20 then processes this line of data items in accordance with control information in alpha, beta and gamma channels and auxiliary control information from units 80, 82, 84 of processer 18. Unit 20 reads out data words from the memory address specified by addresser 30 through read unit 12–4, applies it to text register 90 and then punch control 92 in response to the supplied control information operates punch 94

Figure 4:
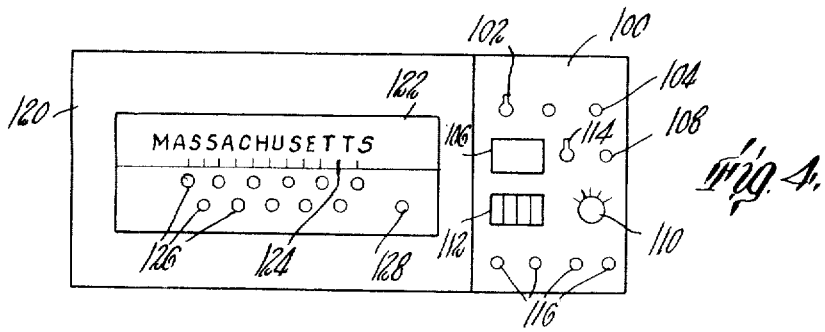
FIGS. 4 and 5 are views of control panels associated with the apparatus shown in FIGS. 1 and 3.
Figure 5:
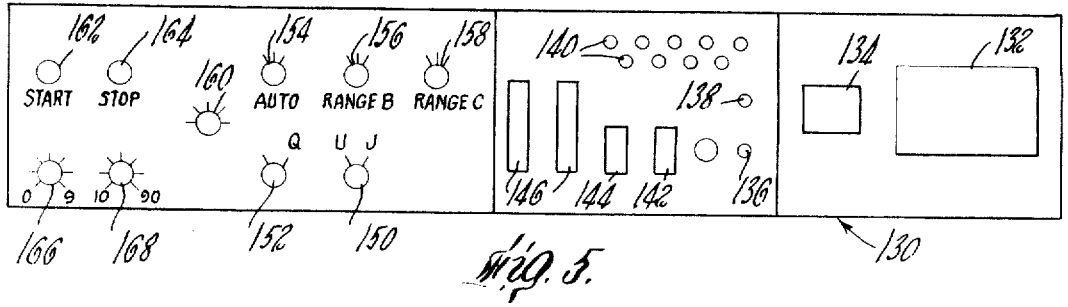

Manual controls for the apparatus are indicated in FIGS. 4 and 5. On the main control panel 100 shown in FIG. 4, there is provided an input power switch 102, a prime or start-up button 104, a line counter indicator 106 to indicate the number of lines that have been processed by the unit, a line release button 108, line length controls 110 and 112, central clock control 114, and a series of control buttons generally indicated at 116 (bell mode, no hyphen, stop, and start).

Adjacent this main control panel 100 is a display control panel 120 which includes screen 122 for the display unit 72. On this display screen is marked an overset point 124. Immediately below the display screen are hyphen buttons 126 which are aligned with the interletter locations of the display. A control in the form of interword button 128 functions as a portion of the manual intervention control 74.

A second set of controls associated with the processer is mounted on a separate panel 130 (FIG. 5). One section of this panel receives pluggable unit 132 which determines the weight to be accorded to each character as a function of the nature of the type to be employed by the type-setting machine to which this processer is coupled. A timer for indicating the amount of time the apparatus has been in use is provided at block 134. Other controls include power control button 136, a power-on indicator 138, D.C. supply indicator lights 140, a power connector plug 142 for the reader 14, a power connector plug 144 for the punch 20, and two power connector plugs 146 for this display unit 72.

Still further manual controls include switch 150 which is set according to the nature of the input data (justified (J-wire service) or unjustified (U)); switch 152 which is set to the Q position if the associated line casting apparatus has an automatic quadder device; three control switches 154, 156, 158 which enable the operator to vary the interword spacing that will be assigned by the processer as a function of the relation of the actual length of the justified line to the overset length; and a group of controls which are utilized for indentation operations—select switch 160, line start switch 162 which indicates the line of the paragraph in which indentation is to start, stop switch 164 which indicates the line of the paragraph where indentation is to stop, and EN weight controls 166, 168 which are set to indicate the amount of indentation to be provided. This latter group of controls provides flexible indentation of data at the will of the operator.

*Central clock*

Figure 6:
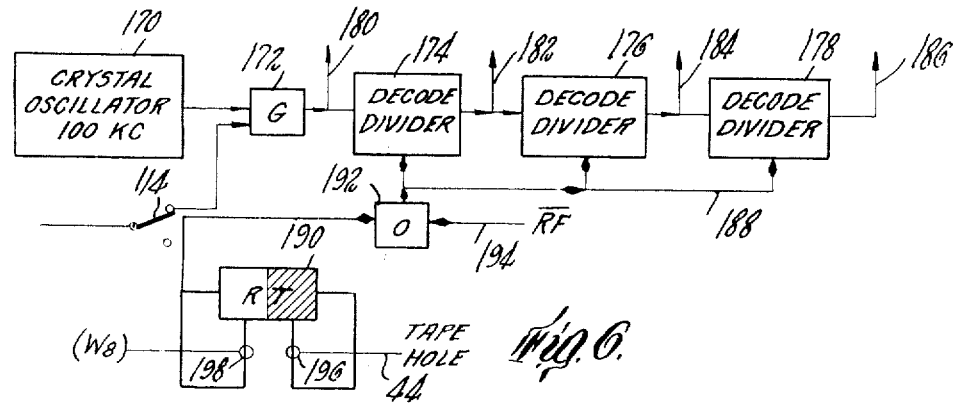
FIG. 6 is a block diagram of the central clock 22.

The central clock 22 is indicated in block form in FIG. 6. This clock includes a one hundred k.c.p.s. oscillator 170 which passes pulses through gate 172 (conditioned by switch 114) for application to three decade dividers 174, 176, and 178. The central clock thus produces output pulses on line 180 at a one hundred k.c.p.s. rate, on line 182 at a ten k.c.p.s. rate, on line 184 at a one k.c.p.s. rate, and on line 186 at a one hundred c.p.s. rate. The outputs of the decade dividers, however, are contingent on the conditioning of the decade dividers by a signal on line 188. This signal is passed through the main controls from RT flip-flop 190 whose output level passes through OR circuit 192 to generate the level on line 188. An alternative input to OR circuit 192 is over line 194. Flip-flop 190 is set by a signal over line 44 through input gate 196, which signal is produced by the reader 42 on sensing a tape hole and is cleared through gate 198 by the trailing edge of the $W_8$ pulse in each cycle. Thus, the $W_0$ pulse is effectively inhibited and the signal over line 44 is substituted for it.

Machine cycle timing is indicated in FIGS. 7 and 8. The operation rate of the input and output devices 14 and 20 is approximately one hundred c.p.s., the rate corresponding to the pulse output on line 186. A timing diagram indicating the operation of output device 20 is shown in FIG. 7. As there indicated, each machine cycle is divided into ten W time periods (each time period corresponding to the one kc.p.s. output on line 184), and each W time period is divided into ten X time periods (each X period corresponding to the ten kc.p.s. output on line 182). Within each X time period ten Y pulses are generated, and these Y pulses are combined in conventional manner to produce operating pulses. For example, in the $W_4X_1$ period, three pulses, $n_a$, $n_b$, and $n_c$, are generated for punch operation control. The $n_a$ and $n_b$ pulses are each twenty microseconds in duration and the $n_c$ pulse is thirty microseconds in duration. A similar series of pulses ($m_a$, $m_b$, and $m_c$) is generated in the $W_4X_2$ time period to control the readout of data by read circuit 12–4 from memory 10. Other pulses are similarly generated, for example, in the $W_4X_3$ time period, a pulse denominated $m_3$, which is one hundred microseconds in duration, is indicated.

A similar timing diagram for pulses generated for control of processers 16 and 18 is shown in FIG. 8. Each of these processers has access to memory 10 during each W cycle, whereas the input and output devices 14 and 20 have access only once during eeach machine cycle. The processer 16 has access to memory during the $X_6$ cycle (under control of the series of pulses denominated $q_a$, $q_b$, and $q_c$, which produce a core memory read-out, write-in signal as indicated). Similarly, processer 18 has access to memory in the $X_0$ period under control of pulses denominated $p_a$, $p_b$, and $p_c$. Memory access for punch 20 is in the $X_2$ time period, and the memory access for reader 14 is in the $X_4$ time period so that the four processing units have access to memory 10 at specifically different time periods. During the pulse periods $X_1$ through a portion of $X_5$, a space width count of the characters is performed by space width counters 64, and during the periods $X_1$ through $X_7$, a space width count of the interwords is performed by the same counters 64. (A greater amount of time is allowed for interwords as the weight accorded that item may be greater than the maximum weight accorded a character. Also, as indicated on the diagram of FIG. 8, the display 72 is turned on or off at the end of the $X_7$ time period, and justification circuitry 66 has an $X_9$ time period in which $j_a$ and $j_c$ pulses operate logic units.)

*Processing unit coordination*

As indicated above, access to memory 10 is controlled by the addressers 24, 26, 28, and 30. Addressers 24 and 30 are stepped only in the forward direction while addressers 26 and 28 are reversible, that is, they can be stepped in either the forward or backward directions. Initially the addressers are automatically set to the addresses indicated in FIG. 9a—that is, addresser 24 (associated with the input unit 14) and addresser 26 (associated with processor 16) are set to address 015, while addresser 28 (associated with processer 18) and addresser 30 (associated with the output unit 20) are set to address 000. In addition, the justification address register 40 is also set to address 000. The system is then started and input device 14 writes information into memory at a rate approximately one hundred cycles per second.

A typical relationship between the processing unit in terms of memory addresses is indicated in FIG. 9b. As there indicated, the reader 14, which can step only in a forward direction, is at the most advanced address, processer 16 is at the next address and can be stepped in either the forward or backward direction, processer 18 is at the next address and similarly can be stepped in either the forward or backward direction, JAR 40 is at the next address and can be stepped only in the forward direction, and punch 20 is at the last address and can be stepped only in the forward direction. As memory 10 is in the form of a closed loop (address 224 being immediately before address 000), it is necessary to prevent the input unit 14 from writing data into a memory address before the output unit 20 has read the processed information out of memory 10. For this purpose, there is provided a loop of correlating controls for the addressers which includes the compare circuits 32, 34, 36, and 38. These compare circuits control the addressers to prevent one processing unit from operating on a data item (word) before the previous unit has acted upon that item. To this end address signals from the reader-addresser 24 are applied to compare circuit 38, and similarly address signals from punch addresser 30 are also applied to compare circuit 38. The output of compare circuit 38 is applied to addresser 24 to stop reader 14. Each memory address may be considered to consist of a more significant section (row) and a less significant section (column, for example). When the reader 14 is sensing a memory address on the same row of memory as the punch 20, the reader is stopped by disabling reader-addresser 24, and that addresser is not started again until that row equality is destroyed by punch addresser 30 being stepped forward into the next row.

In like manner, comparator 32, between the reader-addresser 24 and the addresser 26 of processer 16, causes processer 16 to stop when equality is sensed between the address at which the reader 14 is currently writing information in memory and the address to which addresser 26 is set. Thus, processer 16 is prevented from operating on any memory address until the reader 14 has written current information into that memory address. Similarly, comparator 34 senses the addresses indicated by addressers 26 and 28, but, in a manner similar to comparator 38, senses only the more significant portion of the memory address and thus maintains the processers 16 and 18 in the order of at least fifteen addresses apart. (This permissible proximity of the addressers may be varied by modification of the comparator as is well known.) This allows ample number of character spaces for the processer 16 to modify data stored in the memory 10 before that data is operated on by processer 18.

Processer 18 generates justification information for each line of text and the address at the end of each line, when justified, is stored in the justification address register 40 by a gated transfer from addresser 28. The address value indicating the end of line is applied to comparator 36 and the punch addresser 30 also applies address signals to this comparator. When equality of address is detected, comparator 36 stops punch 20 so that the punch does not process any data that is not a part of a justified line. In certain processing modes comparator 36 also stops processer 18 until punch 20 has cleared all lines of justified text from memory 10 and holds punch 20 after that until processer 18 has "justified" the next line.

*Input unit 14*

Additional details of the control of the input device (tape reader 14) are shown in FIG. 10. Data is transferred from the tape reader 42 through the text register 46 and then is gated into the read-write circuits 12–1 for writing into memory 10 at the address specified by reader-addresser 24. When a sprocket hole in the tape is sensed, reader 42 produces an output on line 44 which sets RT flip-flop 190 (FIG. 6) (indicating reader control) and the resulting output level through OR circuit 192 energized the decade dividers 174, 176 and 178 for generation of the W, X, and Y clock pulses. The $W_0$ pulse (line 220, FIG. 10) clears RG flip-flop 222 and the resulting transition sets RF flip-flop 224 to provide a conditioning level on line 226 for operation of the tape reader 42. A text item is then transferred by tape reader 42 into the text register 46. The signals stored in the text register are applied to decoder 230 which produces case outputs on lines 232 and 234, respectively, for control of CA flip-flop 236. When a change from lower case to upper case is sensed, an output is produced on line 232 to set flip-flop 236, producing an output on line 238 to condition stage 6 of transfer gate 240. Similarly, if the change is from upper case to lower case, the decoder produces on output on line 234 to clear case flip-flop 236 and remove the level from line 238. (Decoder 230 also detects special codes, such as RO (rub out), TF (tape feed), and stop, and generates outputs indicating these codes over line 242. Typically the leading edges of these code signals are transferred through gates conditioned by an RF, $W_0X_4$ pulse which is applied on line 244.)

(Where a symbol represents a data item, such as a tape feed character, it is indicated in the drawings by a horizontal line underneath. Signals from control flip-flops are indicated without any line underneath the identifying letters. A line above such letters indicates a signal absence—a cleared flip-flop or a character other than the indicated character.)

Should comparator 38 indicate that the reader 24 was approaching the punch addresser 30 too closely, it will produce output on line 250, which output will clear the flip-flop 224, de-energizing the tape reader drive, but at the same time flip-flop 224 will produce a signal ($\overline{RF}$) over line 194 through OR circuit 192 (FIG. 6) to enable the continued generation of time pulses independently of the operation of the tape reader 42. This holding condition will be maintained until the punch 20 clears the entire line in memory 10 ahead of the memory address which the reader-addresser 24 is specifying. At that time the comparator 38 will produce an output on line 252, setting flip-flop 222. The next $W_0$ pulse will then clear flip-flop 222, and the resulting transition will set flip-flop 224 in a synchronizing operation. Control is then returned to the tape reader and the time pulse distributor circuitry operates in response to the drive of that reader.

With data in the text register 46 in a reader (RF) $W_0X_4$ cycle, gates 260, 262, and 264 are conditioned so that a sequence of pulses is passed by to those gates to transfer the text word and case information into memory 10 in a write operation, and at the end of the $W_0X_4$ pulse, the reader-addresser 24 is set (diagrammatically indicated by a pulse passed by gate 264). Thus, a text character together with case information has been written into memory 10 and the addresser 24 has been stepped to the next address at the end of the reader core gate timing interval.

A further control is provided in the input processor 14 by counter 280 which is arranged to sense a particular character, in this case tape feed ($\underline{TF}$). Gate 282 channels pulses as stepping pulses to counter 280 and gate 284 channels pulses as resetting pulses to that counter. These two gates are conditioned by the reader core gate level (line 244). If the decoder 230 senses a tape feed character, an output from the decoder on cable 242 will be passed by gate 282 to step counter 280. If the decoded character is not the tape feed symbol, the counter will be reset (gate 284). Should a predetermined member of successive tape feed symbols be detected, the counter would record these and finally produce an output on line 286 which would set flip-flop 290 and its setting transition would clear flip-flop 224. When this occurs, the tape reader data transfer to memory 10 is interrupted (by means of exclusive OR circuit 292) until a text character other than the tape feed symbol is sensed. That symbol clears counter 280 and flip-flop 290 so that data transfer to memory 10 is resumed. This logic prevents the entire memory 10 from being loaded with tape feed symbols. Also, the input data itself may be used to control the processing operation. A stop code, for example, at the end of one processing operation may enable the transmission of a particular instruction, via the display, to command the supervising operator to adjust one or more of the control switches to modify the indentation control, for example. Controls may be provided to insure that the punch 20 will clear memory 10 of all significant previously entered data before it is stopped by an output from comparator 36. It will be recalled that even when flip-flop 224 is cleared and thus the reader drive is de-energized, the central clock 22 continues to generate W, X, and Y pulses so that processing will continue until the punch addresser 30 is stopped by comparator 36.

*PRB processor 16*

The processor 16 and its control logic are indicated diagrammatically in FIG. 11 and examples of the stepping of addresser 26 during such processing is indicated in FIG. 12. This processer senses each text character stored in memory 10 by reader 14 and modifies or deletes certain of them to facilitate the generation of justification information by processor 18. Addresser 26 is reversible and is stepped by either direction by the leading edge of the $X_7$ pulse. Addresser 26 thus is stepped at the end of the core gate for this processor. When line 300 is conditioned, the addresser is stepped in the forward direction, and when line 302 is conditioned, the addresser is stepped in the backward direction. The back gate (line 302) is conditioned through OR circuit 304 by either of two control flip-flops 306 (CAL), 308 (CEL) in the control logic. There are four other control flip-flops, 310 (PEB), 312 (IWR), 314 (HYR), and 316 (FD).

The following are the examples of code revision handled by this processor:

Delete HYCR—if a carriage return (CR) follows a hyphen (HY), both characters should be deleted as this is justification information. However, if a hyphen occurs which is not followed by a carriage return, the hyphen should be retained;

Change CR into SB—the carriage return indicates the end of a line between words and therefore it should be changed into a space band (interword indicator) (unless it is part of a tabulation or end of paragraph code);

If CR is part of a tabulation or end of paragraph code, the carriage return symbol is retained. Such code sequences include QL CR and CR EM;

When a space band (SB) is sensed, all the spaces following the space band should be deleted so that the text may be justified in a compact manner;

An operator may make an error and upon realization insert word cancel code (PF) in the text train. In this case it is desired to delete all the characters before the PF symbol back to the end of the last complete word.

The control logic for these operations is shown in FIG. 11 and responds to the output of decoder 298 coupled to text register 50. As indicated above, there are two control flip-flops 306 and 308, and when either is set, it causes the stepping pulse (leading edge of $X_7$) to step addresser 26 in the back direction (toward the address of processor 18). Otherwise application of stepping pulses will step the addresser forward (toward the address of reader 14). In addition, there are text modification controls which are coupled to the text register 50 to modify its contents. These controls include AND circuit 320 and OR circuit 322.

In operation, a word is read from memory in the beginning of the $X_6$ cycle, stored in register 50, and decoded by decoder 298. The control logic senses the decoded word and may modify the contents of the text register so that a different word is written back into memory 10 in the write portion of that $X_6$ cycle. The output from AND circuit 320 causes a space band (SB) code to be written in memory 10 and the output from OR circuit 322 causes a rub out (RO) code to be written in memory.

The sequence of HY CR is deleted in the following manner. When the hyphen is detected by decoder 298, flip-flop 314 is set by the signal on line 330 from the decoder and it produces a conditioning level on line 332 which conditions one input of AND circuit 334. If a CR code follows the HY code, an input is provided on line 336 (the second input to AND circuit 334) and flip-flop 306 is set. The setting of flip-flop 306 produces a first output level on line 338 through OR circuit 304 to condition the back gate of addresser 26 so that the $X_7$ stepping pulse steps that addresser in the back direction. At the same time a second output level is applied on line 340 to OR circuit 322. The signal applied through OR circuit 322 to the text register 50 overrides the code that is there and replaces that code with a rub out (RO) code. This occurs before the write portion of the $X_6$ cycle in which the CR character code was readout, as indicated above. The stepping pulse subsequently applied to the addresser steps the addresser in the backward direction to the HY code, and as the flip-flop 306 remains set, that code is also changed to an RO code. Addresser 26 then steps to the next character in the back direction. As soon as OR circuit 342 has an output (detection of a symbol other than LC, UC, EL, CR, HY, or RO), AND circuit 344 is conditioned and clears both flip-flops 306 and 314. With the removal of the level from line 338, the forward gate of addresser 26 is again conditioned, and it will step forward past the two RO codes to the further text character codes read in by reader 14. This sequence of stepping of addresser 28 is indicated in FIG. 12a. It will be noted that as soon as OR circuit 342 has an output, as in the case of a carriage return not followed by the hyphen, flip-flop 314 is cleared by a pulse passed by AND circuit 344, and thus that hyphen code is retained in the text.

A second code revision involves the changing of a carriage return symbol into a space band symbol if the carriage return is not part of a tabulation or end of paragraph code. In unjustified tape, the sequence indicating a tabulation or end of paragraph code is a Q (or VR) code preceding the carriage return, while in wire service code, the tabulation or end of paragraph code is signaled by carriage return being followed by a space code, e.g., EM. These sequences are sensed by the flip-flops 308 and 310.

In the unjustified tape mode, switch 150 is set to the lefthand position shown in FIG. 11 (U in FIG. 5) so that line 350 is conditioned, and if a Q code is sensed, flip-flop 310 will be set. The setting of flip-flop 310 will remove the conditioning from line 352 (the input gate to flip-flop 308) so that if a carriage return follows the Q or VR code, it will not set flip-flop 308. If the signal following the Q code is anything other than CR, a signal will be applied through switch section 150–5 (on line 366) to condition the gate to pass a $q_a$ pulse which resets flip-flop 310. This operation is indicated in the upper diagram of FIG. 12b.

However, should a Q code not precede the CR code, flip-flop 310 will not be set, and therefore a conditioning level will be applied on line 352 so that the CR code will set flip-flop 308. The CEL and CR signals condition AND circuit 320 and cause the CR code in text register 50 to be changed to an SB code. The CR level also conditions the reset gate on line 354 of flip-flop 308 so that the $q_b$ pulse in this cycle will reset the flip-flops 308 and 310. The CEL flip-flop 308 thus is set and reset before the end of the $X_6$ time period and thus the $X_7$ pulse steps addresser 26 forward. The operation is indicated in the lower half of FIG. 12b.

If the text is in wire service form, switch 150 is in the right position (as shown in FIG. 11). In this mode if the carriage return is followed by an EM code, both codes are to be retained, but if the carriage return is not followed by that code, the carriage return is to be deleted. In this mode the PEB flip-flop 310 is set in response to the sensing of a carriage return code through conditioned gate 360. Then line 362 conditions gate 364, but if the next character is EM, line 366 will be conditioned, however, and the $q_a$ pulse will clear flip-flop 310. This sequence is indicated in the upper part of FIG. 12c.

However, if an EM code does not follow the CR code (in actuality any text character other than the indicated inputs to either OR circuit 342 or 370), the signal is passed by gate 364 to set flip-flop 308, and line 372 to OR circuit 304 is then conditioned so that addresser 26 is stepped in the back direction. When decoder 298 applies a signal to AND circuit 320 indicating that a carriage return code is in the text register 50, the output of AND circuit 320 then changes that carriage return code to a space band code. At the same time, the carriage return code on line 354 conditions the gate so that the $q_b$ pulse clears CEL flip-flop 308 and PEB flip-flop 310. With the clearing of flip-flop 308, the conditioning level on the back gate for addresser 26 is removed and the addresser steps forward again as indicated in the lower part of FIG. 12c.

A fourth mode of character revision is indicated in FIG. 12d. When a space band is sensed, gate 380 is conditioned, and a $q_a$ pulse (occurring just before the next character is written into register 50) turns on flip-flop 312. With the setting of IWR flip-flop 312, a signal is applied over line 382 through OR circuit 322 to change the new text code in register 50 to an RO code. Flip-flop 312 remains set until a standard text code (non-space) is detected by decoder 298, and in response to the detection of such code, the leading edge of the pulse resulting from such decoded code immediately resets the flip-flop 312. Thus, the IWR level (line 382) is removed before the readout character is to be rewritten into memory 10. (This space deletion circuitry may have an interlock (switch section 150–3) which enables space deletion only in one input tape mode.) This operation is indicated in FIG. 12d.

The fifth illustrated operation performed by this circuitry is the cancelling of a text item in response to detection of a word cancel code ($\overline{PF}$). When such code is detected by decoder 298, a signal is applied over line 390 to set CAL flip-flop 306. The setting of flip-flop 306 conditions the addresser back gate via OR circuit 304 and also conditions the rub out code circuit in the text register through OR circuit 322. The setting transition of flip-flop 306 also sets FD flip-flop 316 which conditions four stage (fifteen binary step) counter 392. That counter is then stepped by $q_a$ pulses. Flip-flop 306 remains set until the counter goes to zero (and is cleared through gate 394) or a space band or carriage return is detected (OR circuit 396) which then clears flip-flop 306 through gate 398. The clearing of flip-flop 306 removes the character change level from OR circuit 322 and also returns the stepping direction of addresser 26 to the forward direction. When addresser 26 commences to step forward, flip-flop 316 is at the same time reset by the level that conditions the forward gate on addresser 26.

Control of the stepping of addresser 26 in response to outputs from comparator 32 is similar to that utilized in the tape reader circuitry and therefore that circuitry is not described in detail in connection with this processor.

*PRA processor 18*

The PRA processor 18 is shown in block diagram in FIG. 13. That processor receives (during the $X_0$ time period) coded text information from the memory address specified by addresser 28 (that addresser being stepped at the beginning of the $X_0$ period) and generates justification data for control of the output unit 20. As indicated above, this processor senses each coded word and accumulates a width count to provide four different line length counts or ranges. A coded text input and these ranges are indicated in the diagram of FIG. 14, with general codes designated by an undulating line and each interword by a caret (Λ). These four ranges are designated A, B, C, and D.

This line length count is accumulated in the space width counting circuitry indicated in FIG. 15. That circuitry includes four counters 400, 402, 404, 406, each of which has associated with it a flip-flop 410, 412, 414, and 416 that is set when the counter is stepped out (to zero, for example). Each counter is initially set to the same count as controlled by line length control 112. These counters are stepped by signals from pulse distributor 420 which is cycled to distribute (during the time periods $X_1$ through $X_7$) a series of one hundred pulses. Input pulses are fed to the pulse distributor from a free running multi-vibrator 422 (operating at one hundred fifty kc. p.s.) through gate 424. Gate 424 is conditioned to pass pulses from multi-vibrator 422 when control flip-flop 426 is set. When OR circuit 430 has an output, synchronizing flip-flop 428 is set by the leading edge of the $X_1$ pulse, and the next pulse from multi-vibrator 422 clears flip-flop 428, and that transition sets flip-flop 426 to condition gate 424 to pass pulses to pulse distributor 420. That circuit then channels pulses to text gating circuit 432 and interword gating circuit 434. When a predetermined number of pulses have been applied to pulse distributor 420, it generates an output on line 436 to clear flip-flop 426 and terminate the application of pulses to pulse gating circuits 432 and 434.

Pulse signals indicative of the weight of input characters are normally applied to the gates 432 and 434 as a function of the inputs to decoder 62 and case register 440. The output signals from the decoder are applied to either the common case switch circuit 442 or to both the upper case switch circuit 444 and the lower case circuit 446, depending on the nature of the decoded character. The output from case register 440 conditions one or the other of switch circuits 444, 446, depending on the case of the decoded character in the text. The outputs from these switch circuits are applied to the pluggable width plug unit 132 which, as a function of the decoded character and the weight that is to be accorded that character (a function of the type font), conditions either diode matrix circuit 448 or 450. A signal indicative of the "weight" of a text character is applied through matrix 448 to text gate unit 432 to pass a series of pulses through OR circuits 452 to all of the space width counters 400–406. When an interword is detected, a signal is applied to matrix 450 to condition gates in unit 434 which channel differing numbers of pulses through OR circuits 452 to the space width counters. The interword "weight" applied to counter 406 may be the smallest space band weight, while increasingly larger weights are applied to counters 404, 402, and 400. The interword weight applied to counter 400 may be the EM weight for example. Thus, as each interword is sensed, the contents of the four counters are changed relative to one another. Counter 400 is the first to step out and sets flip-flop 410. Counter 402 is the next to step out and it sets flip-flop 412. Counter 404 steps out and sets flip-flop 414. Finally, counter 406 steps out and sets flip-flop 416, which is termed the "overset" condition that terminates this space width counting operation. The output levels of the flip-flops are applied to logic unit 454 (FIG. 13). The location relative to the coded text characters that the flip-flops 410–416 set provides range information as indicated in FIG. 14 and as set forth in the following table:

| Flip-Flop Set | Range Commenced | Encoder 454 |
|---|---|---|
| None | D | $\alpha_0\beta_0$ (00) |
| 410 | C | 10 |
| 412 | B | 01 |
| 414 | A | 11 |
| 416 | Overset | |

Control for this counting operation is under the control of JPA programmer 456 which has five modes—Zero through Four. In mode Zero ($JPA_0$) it supplies a conditioning level to OR circuit 430 (FIG. 13) and a conditioning level through OR circuit 457 and gate control 458 to the forward gate on addresser 28 so that addresser will be stepped forward at the beginning of each $X_0$ time period. (This forward stepping path is indicated by line 470 in the PRA routing diagram of FIG. 14.) A text character is read from the specified memory address during the $X_0$ time period and stored in text register 60. A space width counting operation for that character is initiated in the $X_1$ time period, and the space width count for that character is stored in the counters 400–406. Addresser 28 is stepped and this counting operation is repeated for successive characters in each processor cycle with counters 400–406 being successively set to zero. As each counter goes to zero, its associated flip-flop is set and $\alpha\beta$ range information is entered into the alpha and beta channels of the control register 458 through control unit 460 for writing into memory 10. As indicated in the table, zeros are initially written in both the alpha and beta cores of the memory words; after flip-flop 410 is set, a one is written in the alpha core and a zero is written in the beta core (indicating Range C); after flip-flop 412 sets, a one is written in the beta core and a zero in the alpha core (indicating Range B); and after flip-flop 414 sets, one's are written in both the alpha and beta cores (indicating Range A).

When flip-flop 416 is set (indicated at point 472 in FIG. 14), that transition steps the JPA programmer 456 from mode Zero to mode One to terminate the space width counting operation and also to reverse the stepping direction of addresser 28 (along path 474, FIG. 14). In mode One the signals from each memory address are read out (including the $\alpha_0\beta_0$ control information), and an interword sensor 464 is enabled. The readout $\alpha_0$ and $\beta_0$ values are compared (in compare logic 462) with setting of automatic range control 158, and, if at the time an interword is sensed, the alpha and beta values are within the automatic range specified by control 158, two logic units 466 (JE flip-flop) and 468 (JF flip-flop) are set (by the $j_a$ pulse). The setting of the JE logic 466 indicates the line end point has been selected and the setting of the JF logic 468 transfers the $\alpha_0$ and $\beta_0$ values stored with the detected interword to storage in justification control 460. (This point is indicated at 476 in FIG. 14.)

With the setting of the JE and JF logic flip-flops, control of addresser 28 is assumed by the JF logic 468, and it continues to step in the backward direction. In the space next to the detected interword (point 478, FIG. 14), the set JF logic causes a ONE to be marked in the gamma channel of that memory word (indicating the end of a justified line). At the same time the interword detector 464 causes ONE's to be marked in both the alpha and beta channels of that memory word (indicating to the output device 20 that the character to follow is an interword).

As addresser 28 continues to be stepped backwards with the JF logic 468 set, the stored values of alpha and beta from the detected end of line point are rewritten into the alpha and beta channels in inverted form (to distinguish from the interword indication (ONE–ONE)). On sensing a ONE in the gamma channel (at point 480), addresser 28 is reversed and stepped forward (along path 482), without any modification of characters, to the gamma marked at point 478 (end of the line that has just been justified). On detection of gamma in the forward stepping direction mode (point 484), the JE and JF logic units 466, 468 are reset, programmer 456 is reset, as are the space width counters 64, and the current address of addresser 28 is transferred to the justification address register 40 (all occurring at point 484). In the next $X_0$ pulse time period (point 486), the interword is erased (by inserting a rub out code into memory in place of the interword in manner similar to that employed with processer 16), and then programmer 456 is stepped into mode Zero (line 488) to initiate the next space width counting operation.

The contents of the alpha, beta and gamma channels at this point are indictaed in FIG. 14. As the line was justified in Range B, the inverted value of the range indication is stored with each character in the justified line, that is, alpha is ONE and beta is ZERO. An exception occurs in each memory word preceding an interword where both alpha and beta are ONE's—this alerts the punch 20 that there is an interword following. ONE's occur in the gamma channel to indicate line ends. The character words to the right of gamma ($\wedge$ point 478)

have the initial $\alpha_0$ and $\beta_0$ values stored therein and these values will be rewritten during the next space width count operation.

On occasion an interword cannot be located within the automatic justification range established by control 158. In that case manual intervention circuits are energized, the logic of which is shown in FIG. 16, to perform processing of the type shown in FIG. 17. With reference to FIG. 17, addresser 28 is stepped forward along line 490 in $JPA_0$ mode to overset (flip-flop 416 being set at point 492). Programmer 456 is then stepped into $JPA_1$ mode (path 494) and addresser 28 is stepped in the backward direction in an interword search. Display controlling counter 500 (FIG. 16) is utilized in this mode to limit the length of search for an interword, the counter being cleared for example when the programmer 456 steps from the mode Zero to mode One and being stepped with each stepping of addresser 28 to a predetermined count which sets flip-flop 502. The setting of flip-flop 502 causes programmer 456 to step into $JPA_2$ mode, reversing in the direction of addresser 28 and applying a conditioning level to the input gate of DP display counter flip-flop 504. Counter 500 counts the stepping pulses of addresser 28 along path 494, and then is stepped down along path 496. When it reaches zero (overset-point 498, FIG. 17), flip-flop 504 is set and energizes the character generation circuitry 70 to display the character then stored in the text register 60 at the position in the display 72 controlled by counter 500 (the "overset" point at the center of the display). Addresser 28 continues to step forward, and counter 500 counts the characters to the right of the overset point 124—as viewed in the display console (FIG. 4) that are displayed. In this mode as counter 500 goes through zero, SN control flip-flop 506 is set to provide an indication that the counter 500 and addresser 28 are stepping forward from the overset point (plus). Forward shift pulses continue to be applied until the counter 500 reaches a count of twelve, at which time a pulse is applied through OR circuit 508 to set D.C. flip-flop 510. When flip-flop 510 is set, addresser 28 is reversed and stepped back thruogh zero (at which time flip-flop 506 is complemented) to a count of twelve beyond zero, at which time another pulse is applied through OR circuit 508 to complement flip-flop 510 and the stepping direction is again reversed. (Should an interword be located in either group of twelve characters, detector 464 will apply a signal over line 512 and complement flip-flop 510 at that point to reverse the stepping direction of addresser 28. Thus, only one complete word at most is displayed at console 120.) During the $JPA_2$ mode, operation of the processer 18 is controlled by the display control counter 500. This processing is indicated by loop 514 in FIG. 17.

The display unit 72 responds to pattern generator 70 which is controlled from the decoder 62. This apparatus may be of the type shown in the Gordon et al. Patent 2,920,312, and it may employ a 7×9 dot generation matrix for the display of a character whose representative signals are stored in the text register 60. Counter 500 control the deflection of the beam generated by the dot generations matrix to the proper location of the display 72 so that the displayed series of characters are centered about the overset point 124, indicated on the face of display console 120.

With the display energized, addresser 28 is following the display loop 514 indicated in FIG. 17. Simultaneously with the energization of the display by the setting of DP flip-flop 504 and the existence in the $JPA_2$ mode, AND circuit 520 is energized which enables the manual intervention circuitry also shown in FIG. 16. That circuitry includes the hyphen push buttons 126, interword push button 128, encoder 522, a counter 524, two control flip-flops 526, 528, gate 530 and AND circuit 532. With the enabling of the push-button logic, depression of one of the push buttons 126 will enter a value indicative of the location of this push button relative to the overset point through encoder 522 into counter 524. This entered interletter position is the point the operator (O) has selected for hyphenation. (Should an interword location be displayed (outside the specified automatic justification range), the location may be selected for line end by depression of button 128.) When a push button, either 126 or 128, is depressed, HA flip-flop 526 is set. When counter 500 goes through Zero, an output is applied on line 534 to AND circuit 532 conditioned by the cleared D.C. flip-flop 510 (indicating stepping in the reverse direction). The resulting output from AND circuit 532 clears HA flip-flop 526 and sets HC flip-flop 528. The set flip-flop 528 then conditions gate 530 to pass $p_a$ pulses to step counter 524 down. (This point is indicated at 542 in FIG. 17.) When the counter produces a zero output on line 540, this signal is applied to the justification control 460 (FIG. 13), and the JE logic 466 is set. If the $\alpha_0$ and $\beta_0$ values at that point are within the range specified by control 158, the JF logic 468 is also set. In response, (one) the alpha and beta values indicative of the range in which the line is justified are stored; (two) flip-flop 504 is cleared to deenergize the display; and (three) the addresser 28 is controlled to step back and the end of line indication is marked in the gamma channel (point 544) and the alpha and beta values are revised in the other two control channels in JPA mode Three (along path 546).

If interword push button 128 is depressed, the synchronizing (HA) flip-flop 526 and the gating (HC) flip-flop 528 are set to produce stepping of counter 540. This counter counts down and, if any interword is detected before it counts out, the JE flip-flop is set at that point. (Should counter 540 count out, the display is not deenergized, signaling the operator that no interword exists within the counter range.) Also, should an interword be detected before the selected location for hyphenation, the JE logic will be set at that point (and the JF flip-flop will be set if it is within the range specified by control 154).

Operation of processer 18 where the selected end of line location is outside of the automatic justification range is indicated in FIG. 18. In this case, JE flip-flop 466 is set (point 550) and programmer 456 is stepped into mode Three. However, as the JF flip-flop 468 is not set, programmer 456 immediately steps into JPA$_4$ mode (point 552). In this mode addresser 28 is stopped (by compare circuit 36) until the address of punch 20 is equal to the address specified by the justification address register 40—in other words, until the punch has cleared all the previously justified lines from memory storage 10. When the punch 20 has cleared the last justified line, its address equals that of register 40, and compare circuit 36 produces an output to step programmer 456 into mode Five. In this mode addresser 28 is stepped back, a ONE is marked in the gamma channel in the next address (under the control of the JE logic 466), and stepping is continued in the reverse direction towards the previously entered gamma. Simultaneously, the special justification circuitry 80 is energized. This circuitry includes JPC programmer 560 (which is operative through modes Zero–Nine), an interletter counter 562, an interword counter 564, a control counter (JPB) 566, and a compare circuit 568 which senses counters 564 and 566 and controls the stepping of counter 562 through AND circuit 570, OR circuit 572 and gate 574.

In JPA mode Five control of addresser 28 is transferred to JPC programmer 560. In JPC mode Zero addresser 28 is stepped back to the indicated end of the previously justified line (path 554), and on sensing of ONE in the gamma channel, programmer 560 is stepped from mode Zero through mode One (as a control) into mode Two. In mode Two (JPC$_2$) addresser 28 is stepped forward (path 556), control counter 566 is stepped to a count of ONE, and gate 576 is conditioned as is AND circuit 570. Decoded interword signals are applied to gate 576 over line 578 to step the interword counter 564. When the first interword in the line is sensed, counter 564 is stepped so that the contents of counters 564 and 566 are equal. Compare circuit 568 then produces an output which is passed through AND circuit 570 and OR circuit 572 to condition gate 574. Signals from decoder 62 applied over line 580 then step the interletter counter 562 to record a count of the number of interletter spaces in the second word in the line that is to be justified.

The level conditioning gate 574 is also applied to the space width counter circuitry (FIG. 15) over line 582 and is passed through OR circuits 430 and 584. The output signal from OR circuit 430 conditions the setting gate of flip-flop 428, while the output signal from OR circuit 584 conditions gate 586 and removes normally existing conditioning levels from gates 588 and 590 via inverter 592 so that the counters 400–406 do not respond to decoded text characters. A fixed space weight, for example a TH weight, corresponding to each interletter pulse over line 580 is accumulated in counters 400–406.

On detection of the next interword (at the end of the second word), counter 564 is stepped so that equality no longer exists between counters 564 and 566 and the conditioning level to AND circuit 570 therefore terminates. The termination of the conditioning level to AND circuit 562 removes level 582 and also produces a transition over line 594 that steps programmer 560 into JPC$_3$ mode and reverses addresser 28 to step back along path 596, FIG. 18, to the beginning of the line.

Thus, counters 400–406 have been loaded with a weight count corresponding to the number of spaces in the second text word (or the first complete word after hyphenation). Programmer 560 is automatically stepped through modes, Four, Five and Six (these modes controlling tabulation and indentation operations which will be mentioned infra) into mode Seven, and in mode Seven OR circuit 430 is conditioned and the above-described text weight counting operation is performed (along path 598) to add to the interletter weight already stored in counters 400–406 the weight of text characters until the selected end of line position is reached. If the accumulated weight at the gamma point is now within the specified range, the JF logic flip-flop 468 will be set and programmer 560 will be reset to mode Zero. (Effectively the range locations have been shifted as indicated at 600 from their initial positions.) In the JPC$_0$ mode with the JF logic set, the alpha and beta range values will be written into the alpha and beta channels to specify the interword spacing selected. Addresser 28 steps back to the previously marked gamma (along path 602) and then forward to the most recently marked gamma (point 604), at which point that address is transferred to the justification address register 40. Processer 18 then stops until the punch 20 clears the line of text that has just been justified from memory 10. When this line of text has been translated by the punch (releasing counters 562 and 566), programmer 456 is reset to mode Zero, and the justification circuitry is cleared to commence the processing of the next text items in memory 10.

If the line did not justify in JPC$_7$ mode, programmer 560 is reset to mode Zero and the addresser 28 is stepped back without changing the alpha and beta values. Processor 18 remains under control of programmer 560 and repeats the JPC sequence. However, control counter 566 is stepped so that the interletter spaces are counted in the third word and the above-described cycle is otherwise repeated in an attempt to justify the line of text with the addition of TH spaces in the third word. If that attempt also fails, the cycle is repeated with each succeeding word until counter 566 is stepped out (to Zero). When that occurs, it is assumed that the line of text cannot be justified in JPC$_7$ mode, and that counter output (line 610) causes the programmer 560 to step into JPC$_8$ mode and the routing sequence indicated in FIG. 19. The processor is stepped back along path 612 to the previous gamma, and on reaching gamma programmer 560 is stepped into mode Nine. The space width counters (FIG. 15) are operated to count the text weight of the unjustified line to gamma in the forward direction (path 614). On reaching that gamma in mode Nine, a signal is applied on line 616 (FIG. 13) through OR circuit 572, to condition gate 574 (FIG. 13) and gate 586 (FIG. 15). Pulse signals are applied on line 618 to switch circuit 442 and to counter 562 so that space width counters 400–406 record the weight of TH spaces and the corresponding number of interletter spaces are recorded by counter 562. As soon as flip-flop 410 sets, the line is considered justified, and JF flip-flop logic 468 sets. (Should "overset" occur concurrently, the line is considered justified in a special (bell) mode which will be signaled to the punch 20 and a code indicating this fact is inserted by the punch in the output data.) Programmer 560 is stepped back to JPC$_8$ (in response to the setting of the JF logic), control information is inserted in the alpha and beta channels in the usual manner (paths 620, 622), and the justification address register 40 is updated to the end of line address. Processer 18 then stops until punch 20 clears this line, as punch 20 must refer to the mode of programmer 560 and the contents of counter 562 to properly translate the coded text. In this mode (JPC$_8$) the punch inserts TH spaces between the text characters starting at the beginning of the line until the number of inserted spaces equal the contents of counter 562. The rest of the line is processed routinely. When the punch has completed the processing of the justified line from memory 10, processer 18 clears the justification components and steps forward into JPA$_0$ mode to process the next line of text.

The special justification circuitry 80 may be utilized in an automatic operation (by-passing the display and manual intervention circuitry) by setting control 158 to range D so that the search for an interword will continue beyond the C range, if necessary, and the JE flip-flop 466 will be set upon detection of the first interword anywhere in the line. The gamma (end of line) location is marked on the setting of that flip-flop. Where that interword location is outside the normal justification ranges, processer 18 stops until punch 20 has cleared all the previously justified lines in memory 10 and then steps into control by programmer 560 for the generation of special justification information needed to justify the line. In such operation the manual intervention operation is bypassed so that all lines are justified automatically (and without hyphenation).

As an entire line of text is stored in memory 10, special spacing conditions may be established by processer 18 for control of output unit 20. Such special spacing may involve indentation of one or both margins or the separation of the line of text into columns, or both. If the modification of the line of text involves a fixed number of spaces, it is considered an indentation operation, and circuits 82 control processer 18, while if the number of additional spaces to be inserted in the text is a function of the text itself, circuits 84 control processer 18.

The indent circuitry 82 is indicated in block form in FIG. 20. That circuitry operates in response to indentation controls 160, 162, 164, 166, and 168 (FIG. 5), or codes included in the text, or both. Manual control 160 specifies the indentation mode to be employed, for example, indentation of a TH space, an EN space, or an EM space, or a variable number of EN spaces. If the indentation is to be a variable amount, controls 166 and 168 specify the number of spaces. In addition, the manual controls 162 and 164 enable particular lines in a paragraph to be indented, control 162 specifying the line of the paragraph where indentation is to commence, and control 164 specifying the line of the paragraph where such indentation is to cease. Normally, an entire paragraph will be indented in response to a code signal in the text at the end of the paragraph and in such circumstances control 162 would be set to zero and control 164 would be set to its highest count (effectively removing its influence).

Indent Mode Register 640 is set in response to text signals applied from the text register 60 through decoder 62 and signals from control 160 to provide output signals on lines 641–645 indicative of the nature of the indentation operation. A signal on line 641 indicates to punch 20 that the indentation circuitry 82 is operative. Outputs on line 642, 643, and 644 are applied to the space width counter circuits 64 to cause those circuits to accumulate a space width count of the corresponding space weight, a TH space, an EN space, and an EM space, respectively. An output on line 645 conditions the control circuitry for insertion of a variable number of spaces in the line as controlled by the settings of switches 166 and 168. (Additional outputs (not shown) may be provided from register 640 to indicate whether one or both margins is to be indented and also to identify which margin is to be indented. For example, if both margins are to be indented, the space width counters would be controlled to accumulate twice the count required if only one margin was to be intended.)

At the start of each paragraph, a counter 650 is cleared by a signal over line 652, indicating paragraph end, and each time a line is justified by processer 18, a signal is applied over line 654 (on the setting of JF logic 468) to step counter 650. The output of the counter is applied to compare circuits 656 and 658. Compare circuit 656 produces an output when the setting of counter 650 equals the setting of control 162 and that output sets flip-flop 660. Flip-flop 660, when set, has an output which supplies a conditioning level to AND circuit 662. An output from compare circuit 658 (produced when the setting of counter equals the setting of control 164) clears flip-flop 660 and removes the conditioning level from AND circuit 662. The second conditioning input to AND circuit 662 is from AND circuit 664 conditioned by an indent mode signal on line 641 and a punch stopped signal from compare circuit 36 on line 665. When AND circuit 662 is conditioned, the next $j_a$ pulse sets flip-flop 666 which produces an output to stop the stepping of processer 18 and to condition the space width counters 64 to count weights of the type of spaces specified by control 160 and the number of them (if a variable number) specified by controls 166 and 168. When the specified number of space weight counts has been accumulated, the control flip-flop 666 is cleared by a $j_c$ pulse and an output level is produced on line 668 that enables processer 18 to step forward in the JPA$_0$ mode to accumulate a count in the space width counters 64 from the weights of the characters read from memory 10 by read-write circuits 12–3. Where a variable number of spaces are to be inserted, an AND circuit 670 is conditioned in the indentation mode to condition a forward stepping gate on counter 672, and counter 672 is then stepped by X$_1$ pulses. An output of counter 672 is applied to a compare circuit 674 and that output is compared with the setting of variable indent controls 166 and 168. When a comparison results, a conditioning level is removed from AND circuit 670, (as applied through the inverter 676) and reset gate for control flip-flop 666 is conditioned so that that flip-flop will be cleared by the next $j_c$ pulse.

An example of the processing by this circuitry to indent both margins is indicated in the PRA routing diagram of FIG. 21. The indicated text sequence QL CR EN sets the indent mode register 640. In this illustrated routing, the system is operating in the automatic quadder mode so that processer 18 on detection of the CR symbol is automatically reversed in its stepping direction and marks a gamma at point 680. The alpha, beta codes are changed along paths 682 and then the processer 18 returns to the end of this justified line (point 684). The sensing of the paragraph end produces a signal over line 652 to clear counter 650 and processer 18 steps forward. The next character sensed is applied to set the indent mode unit 640 to supply an indent mode conditioning level over line 641 to AND circuit 664 and an EN space conditioning level over line 643 to the space width counter circuitry 64. The output on line 641 stops processer 18 until the punch 20 has cleared the last justified line from memory 10 and signals this fact by producing an output from compare circuit 36 on line 665 indicating that the punch address is the same as that of justification address register 40. When compare circuit 36 produces that compare signal, AND circuit 664 generates an output that conditions AND circuit 662 so that indent control flip-flop 666 is set.

The resulting level conditions the space width counters 64 to accumulate the count of space weights. When this space width counting operation is completed, flip-flop 666 is cleared, producing an output transition on line 668 which allows addresser 28 to step forward again in $JPA_0$ mode along line path 686 to complete a space width counting operation as above described. The line is justified (with manual intervention and/or special justification if necessary) and processer 18 returns to the end of the justified line (point 688) and that address is transferred to the justification address register 40 in an updating operation. As special circuits have been utilized and the punch address does not equal that of the justification address register, processer 18 stops at point 688 until the punch 20 has cleared the justified line from memory.

Tabulation circuitry 84 is indicated in block diagram form in FIG. 22. The circuitry operates in four different modes to produce tabulation arrangements indicated in the following table:

| Tab Mode | Text Code | Tabulation Arrangement |
|---|---|---|
| A | QL | Right margin indented. |
| B | VR | Two columns of text. |
| C | QC | A single centered column of text. |
| D | VR ... VR | Three columns of text with equal amounts of space between each pair of columns. |

The circuitry includes a tab mode register 700 that is set in accordance with text code outputs from decoder 62. A QL code signal is applied over line 702 to set register 700 to mode A producing an output on line 711. A QC code signal is applied over line 704, setting register 700 to mode C and producing an output on line 713. VR codes are applied over line 706 to AND circuits 708 and 710. The first VR code sets register 700 to mode B producing an output signal on line 712, as the second input to AND circuit 708 is conditioned from inverter 716. However, in mode B that conditioning level from inverter 716 is removed and one input of AND circuit 710 is conditioned. Should a second VR code be sensed, the register will be set in mode D (output on line 714).

When the text includes the tabulation information, the CR code is retained in the text, and when that code is detected during a space width counting operation ($JPA_0$ mode), a signal is applied on line 720 through AND circuit 722 to condition the input gates of control flip-flop 724. That flip-flop is then set by the next $X_0$ pulse. With the setting of flip-flop 724, the resulting output on line 726 stops the stepping of addresser 28. An output indicating tabulation mode, supplied from OR circuit 730, is applied to AND circuit 732 which is also conditioned by the set flip-flop 724 and the space width counter circuitry 64 is thus conditioned to count EN weights in response to $X_1$ input pulses. Gate 734 is also conditioned by the set flip-flop 724 and passes the $X_1$ pulses (delayed by delay unit 736) as complementing pulses to flip-flop 738. Each time flip-flop 738 is complemented, ENA counter 740 or ENB counter 742 is stepped, counter 740 being stepped when flip-flop 736 is set and counter 742 being stepped when flip-flop 738 is cleared. When space width counter 64 reaches overset (producing a signal on line 744 in response to the setting of flip-flop 416), that transition is applied to clear flip-flop 724 and permit addresser 28 to resume stepping. Delay unit 736 delays the application of the $X_1$ pulse to gate 734, effectively excluding recordation of the last EN count. It will be seen that the line length at this point is the length that can be justified. In this mode the overset signal on the line 744 in conjunction with the level from OR circuit 730 sets the JE and JF logic, and the processer 18 inserts the justification information in memory as above described.

The sequence of operations in tabulation mode A is indicated in FIG. 23. The processer 18 is stepping along in $JPA_0$ mode until the QL signal is sensed at point 750. Tab mode register 700 is set in mode A at that point. The CR code is sensed at point 752 and thereupon flip-flop 724 is set to stop addresser 28. Stepping of the space width counters then commences to add to the accumulated text count EN counts (indicated at point 754) until overset. The JF flip-flop logic is then set and flip-flop 724 is cleared to permit processer 18 to resume stepping under JF control in the backward direction, first to mark gamma (at point 756) and then to change the alpha, beta values along path 758. When the processer returns to the end of the line that has just been justified (point 760), the address of the justification address register 40 is updated and as the punch address does not equal that of the justification address register, addresser 28 is stopped until the punch has cleared the justified line with reference to the tab mode register 700 and counters 738 and 740. Upon completion of the translation of this justified line, the control circuitry of processer 18 is reset (point 762) and processer 18 resumes operation in that $JPA_0$ mode. This operation typically is a paragraph end and is utilized where the line casting machine is not equipped with an automatic quadder.

A combined indentation and tabulation operation is indicated in the routing diagram of FIG. 24. At the beginning of the line (point 770) an indentation condition is sensed and control flip-flop 664 is set. The indentation spaces controlled by counter 672 are inserted in space width counters 64 and then flip-flop 664 is cleared (at point 772). Space width counting is then performed on the text in $JPA_0$ mode (along path 774). VR code is sensed at point 776 and register 700 is set in mode B. Space width of the text continues along path 778 until a CR code is sensed (point 780) at which time flip-flop 724 is set and addresser 28 stops. Each subsequent $X_1$ pulse is recorded as an EN weight in space width counters 64 and recorded alternately by counter 738 and by counter 740 (point 782). At overset (point 784) flip-flop 724 is cleared and JF logic 768 is set. Processer 18 then marks a gamma and changes the alpha, beta values and returns to point 786 at which time the justification address register 40 is updated and the processer 18 stops until the punch has cleared this justified line. When the line is cleared (at point 788), the circuitry of processer 18 is reset and addresser 28 is restarted in $JPA_0$ mode to step along path 790.

*Output unit 20*

The control logic of output unit 20 is shown in FIG. 25. The illustrated embodiment of the output unit operates a tape punch 94 which includes punch drivers 800. These punch drivers are controlled by the contents of output register 802 which is set by signals applied through switching matrix 804 from either text register section 90–1 or logic matrix 806. Flip-flop 810 (the controls for which are indicated in greater detail in FIG. 25a) conditions AND circuit 812, when cleared, to pass signals from text register 90–1, and conditions AND circuit 814, when set, to pass signals from logic matrix 806.

In each punch cycle the punch addresser 30 (which can step in the forward direction only) is stepped at the beginning of the $W_4X_2$ time period provided its forward stepping gate 820 is conditioned by an output from AND circuit 822. That AND circuit has an output if comparator 36 indicates that addresser 30 is specifying an address different than that specified by justification address register 40 (output on line 824) and flip-flop 810 is cleared (signal on line 826). During the $W_4X_2$ time period a word is read from the address in memory 10 specified by addresser 30 by read circuits 12–4 into registers 90 (indicated as text register 90–1, case register 90–2, and control register 90–3). In the next time pulse period ($W_4X_3$) a punch operating cycle is initiated by the $m_3$ signal, and in synchronism with the output tape, the punch drivers 800 are operated to translate the signal value stored in output register 802 to the output tape and then a new set of code signals is loaded into output register 802 through switching matrix 804 from the text register if flip-flop 810 is cleared, or from the logic matrix 806 if the flip-flop 810 is set.

Normally output codes are translated to the output tape from memory 10 via text register 90–1. However, control information that has been generated by processer 18 must be incorporated in the serial train of output signals to provide control for the line casting machine. As will be recalled, the weight of every interword (SB) was variable. In addition, TH spaces may be inserted between particular letters of the line of text in a special justification mode. Further, additional spaces may be inserted in a line of text either in indentation or tabulation form. The output unit also enters end of line codes in the output signal train to properly control the line casting machine. The case code (if it was deleted by reader 14) must also be re-inserted in the output signal train. Whenever operations of this nature are to be performed, the control flip-flop 810 is set and the logic matrix 806 is conditioned to provide an appropriate code signal through switch matrix 804 to the output register 802.

To accomplish these operations, the punch control logic includes an ICC programmer 830 which is operated in response to sensing of either a space band signal from text register 90–1 or a gamma signal from control register 90–3. When a space band signal is sensed, the space band is translated through switching matrix 804 to output register 802 but further stepping of addresser 30 may be inhibited for either one or two punch cycles as determined by the setting of controls 156, 158. It will be recalled that if the alpha value is a ONE, the line was justified in Range B (which is controlled by range control 156), and if the beta value is a ONE, the line was justified in Range C (controlled by range control 158). Depending on the setting of the appropriate control, the stepping of addresser 30 may be interrupted for one or two cycles by ICC programmer 830. When a gamma (end of line) signal is sensed, stepping of the addresser 30 is interrupted by ICC programmer 830 and a sequence of eight levels is applied to logic matrix for insertion of a sequence of end of line codes. Examples of these codes are indicated in FIGS. 26–28.

Other programmers included in the control logic include FSP programmer 836 which is operated in response to an indentation condition and generates a sequence of five levels (cable 838 and line 840) and PIP programmer 842 which is operated in response to tabulation conditions through up to five steps. Both of these circuits condition logic matrix 806 through OR cricuit 844 to provide EN code outputs. In special justification mode operations OR circuit 846 will be conditioned to condition matrix 806 to provide TH code signals.

A summary of these operations is indicated in the following table:

| Memory word | PRA Mode | Punch Logic Operation |
|---|---|---|
| SB | | Insert additional space signals as controlled by $\alpha, \beta$ and range controls 156, 158. |
| $\alpha$ | | Insert end of line code sequence. |
| Change of Case | | Insert UC or LC. |
| | $JPA_3$–$JPC_6$ | Insert TH space after each text letter in text word specified by counter 566. |
| | $JPA_5$–$JPC_5$ | Insert TH space after each text letter for number of letters specified by counter 562. |
| | Indent (Reg. 640) | Insert number of EN spaces specified by counter 672. |
| | Tabulation (Reg. 700) | Insert one or two groups of EN spaces located as controlled by tabulation mode; the number of EN spaces being specified by counters 740, 742. |

With reference to FIG. 25a, control flip-flop 810 enables entry into the output register 802 of codes representative of justification information generated by processer 18 from logic matrix 806. This flip-flop is operated either in response to $n_b$ pulses through set gate 850 or reset gate 852 or PIP mode signals through set gate 854 or reset gate 856. Gates 850 and 852 are both conditioned by three groups of input conditions via OR circuits 860, 862, and 864: (one) a change of case sensed by case logic 870 (FIG. 25) which provides a signal on line 872; (two) a first special justification mode in which a TH space is to be inserted after each letter in a particular word (indicated by a signal from AND circuit 874); and (three) a second special justification mode in which TH spaces are inserted after each of predetermined number of letters commencing at the beginning of a line (indicated by a signal from AND circuit 876). Whenever OR circuit 860 has an output, flip-flop 810 is set for one punch cycle and then cleared.

Fip-flop 810 is also set in response to detection of a gamma condition (signal on line 880) and then cleared by a signal from ICC programmer 830 on line 882; and it is set by an indentation mode signal (IND) at the beginning of a text line (signal on line 641) and then cleared when programmer 836 is stepped to mode Four (signal on line 886). Flip-flop 810 may also be set on detection of a space band (line 890) if certain conditions are met. One of these is that the text line was not justified in Range A. If the line was justified in Range A, both alpha and beta values are ZERO, and therefore there will be no output from OR circuit 892. Also, the range controls 156, 158 may specify that even though the line was justified in either Range B or Range C, only the space band will be inserted. For this reason the alpha bit is applied to control 156 and the beta bit is applied to control 158. Should AND circuit 894 be fully conditioned, its output will set flip-flop 810 and ICC programmer 830 will be stepped one or two times (depending on the setting of the appropriate control 156 or 158), and at the end of its cycle will produce an output on line 882 to clear flip-flop 810 so that translation from text register 90 resumes.

Where the control information is associated with each memory word (as in the case of space band information and end of line information), the punch 20 and processer 18 may simultaneously process data. However, in special circumstances, such as special justification, indentation or tabulation, the system is arranged so that processer 18 first processes data and then stops while the output unit 20 translates that data in accordance with instructions from processer 18. The controls that enable this coordination between the two units are indicated in FIG. 25b. The output unit 20, in each mode of operation, it will be recalled, utilizes information loaded into components by processer 18. These components include JPB counter 566, interletter counter 562, indentation control counter 672, tabulation counter A740, and tabulation counter B742. These counters are stepped down by gated $m_3$ signals. Also indicated in FIG. 25b are the programmers 830 and 836 which may also be stepped by $m_3$ signals. Each counter or programmer that is utilized during a code insertion operation is cleared when flip-flop 810 is reset at the end of the operation of that component.

In a first special justification mode (JPA programmer 456 is set in mode Five and JPC programmer 560 is set in mode Zero), AND circuit 900 has two inputs conditioned and each space band conditions a third input so that the $m_3$ pulse is passed through AND circuit 900 to step the JPB counter down. When that counter goes to zero, line 902 conditions an input to AND circuit 874 (FIG. 25a) and whenever a letter code is sensed in text register 90-1 (providing a signal on line 904), flip-flop 810 is set by the $n_b$ pulse for one punch cycle and, during that punch cycle, a TH code is generated by logic matrix 806 (OR circuit 846 providing a conditioning input) and inserted into the output tape. The next $n_b$ pulse clears flip-flop 810 permitting the $W_4X_2$ pulse to step addresser 30 to select the next text character from memory 10 which is translated through switch matrix 804 to output register 802. However, as long as counter 566 produces an output on line 902, a TH space will be inserted after each letter as above described. When the next space band is sensed, counter 566 is stepped, removing the conditioning levels on line 902 to AND circuit 874 and OR circuit 846 and ending this TH insertion operation.

In the second special justification mode, counter 562 is utilized to control the insertion of a TH space after each letter of a series commencing at the beginning of the text line. This mode of operation is indicated by programmer 560 (FIG. 13) being in $JPC_8$ mode. In this mode whenever a letter is sensed in text register 90, AND circuit 910 is conditioned and an $m_3$ pulse steps counter 562 down. Also, AND circuit 876 is conditioned and in response to each letter, flip-flop 810 will be set for one punch cycle. In addition, OR circuit 846 conditions the TH code line of logic matrix 806 by virtue of the output from AND circuit 912. This operation continues with a TH space being inserted after each letter read into text register 90-1 until counter 562 goes to zero. The counter produces an output on line 914 which inhibits further counter stepping and is effective to terminate the conditioning of AND circuits 876, 910 and 912. The output unit then continues to translate text independently of this control.

A third type of operation is indentation (insertion of spaces at the beginning of the line). For this purpose programmer 836 is employed and that programmer is conditioned by an output from indent mode register 640 (FIG. 20) on line 641. That programmer has five steps, Zero–Four, for insertion of code characters. Programmer 836 is stepped, when AND circuit 920 is conditioned, by an output from OR circuit 922, and it is not in mode Two (line 924). Flip-flop 810 is set by an $n_b$ pulse stopping the addresser (which was released when the justification address register 40 was updated), and code signals are inserted from logic matrix 806 as conditioned by signals from programmer 836 over lines 838. When programmer 836 reaches step Two, the conditioning level on AND circuit 920 is removed and gate 926 is conditioned. The $m_3$ pulses then step counter 672 down and at the same time the EN input to matrix 806 is conditioned through OR circuit 844 (line 840). EN spaces equal in number to the initial setting of counter 672 are inserted in the output signal train. When counter 672 is stepped to zero, it applies a signal through OR circuit 928 to step programmer 836 to mode Three. Finally, when programmer 836 is stepped out to mode Four, a signal is applied over line 886 through OR circuit 864 to clear flip-flop 810. (It will be noted that programmer 830 in mode Five ($ICC_5$) may also step programmer 836 through a similar sequence.)

In tabulation operations four different modes may be established, as indicated in the table in column 21. Programmer 844 is operated through a maximum of five steps in response to stepping signals applied through OR circuit 930, as a function of the tabulation mode indicated in the following table:

| Tabulation modes: | Stepping of programmer 844 |
|---|---|
| A | 0, 1 |
| B | 0, 1, 2 |
| C | 1, 2, 3 |
| D | 0, 1, 2, 3, 4 |

The mode of operation is indicated by conditioned line 711–714 and the sequence of PIP modes is selected in response to the setting signal applied on line 748.

Programmer 842 is stepped in response to either a VR code, a CR code, or an output from counters 740 or 742. It will be noted (with reference to FIG. 25a) that when it is stepped into modes One or Three, flip-flop 810 is set, and when it is stepped into modes Two or Four, flip-flop 810 is cleared. In tabulation modes A and B, the number of EN spaces specified by the contents of both counters 740 and 742 are set into the output text as a group, while in tabulation modes C and D, the EN spaces specified by counter 740 are set in as a first group and the EN spaces specified by counter 742 are set in as a second separate group. Also, it will be noted that EN signals are translated during either PIP mode One or Three, and those mode signals applied through OR circuit 844 condition the EN input line to matrix 806.

When programmer 842 is in mode One, gate 940 is conditioned and $m_3$ pulses step counter 740 down. When counter 740 is stepped out, if the tabulation mode is either A or B, OR circuit 942 has an output which conditions AND circuit 944 so that further stepping pulses are applied through gate 946 to step counter 742 down. When counter 742 is stepped to zero, its output on line 948 steps programmer 844. Should the tabulation be either mode C or D, OR circuit 950 will have an output and condition AND circuit 952. When counter 740 is stepped to zero, an output will be produced on line 954 to step programmer 844. In $PIP_3$ mode gate 946 is conditioned by an output from OR circuit 956 and counter 742 is stepped down.

Finally, at the end of each justified text line, on sensing of gamma=ONE, gate 960 is conditioned and $m_3$ pulses are passed through OR circuit 962 and programmer 830 is stepped to provide a sequence of levels for entry of characters into the output text indicating the end of the line. In each programmer step (except step Five), one character line of matrix 806 is energized (if necessary) and signals representative of that character are entered in the output tape. (During step Five programmer 836 may be conditioned.) When programmer 830 is stepped out, it produces a signal on line 882 to clear flip-flop 810, and the translation of a line of text with inserted codes enabling a line casting machine to directly generate a justified line of type is complete. The output unit 20 then immediately proceeds to the next line of text if processer 18 has completed it.

Examples of the operation of output unit 20 are indicated in FIGS. 26–28. In the first example the line has been justified in Range B (alpha is ONE and beta is ZERO). The code punched on the output tape is taken directly from the text until a space band is sensed. Flip-flop 810 is set after the SB signal is transferred to register 802 and reference is made to the setting of Range B control 156. Assume that control 156 is set to SB and EN. Therefore the EN line of matrix 806 is conditioned from programmer 830 via control 156, and one EN space signal is translated to register 802. IC flip-flop 810 is cleared and addresser 30 is stepped to transfer another character from memory 10 to the text register 90. This operation continues with programmer 830 inserting an EN space after each sensed SB until a ONE is sensed in the gamma channel indicating the right margin of the justified line. The alpha and beta values at that point (1–1) indicate that the line was ended at an interword and therefore no hyphenation code is to be inserted. On sensing of this end of line signal, ICC programmer 830 is turned on for eight steps to control the insertion of end of line code signals via matrix 896. This sequence includes a CR code at $ICC_6$ and an EL code at $ICC_7$. Flip-flop 810 is cleared after $ICC_8$ and translation from memory 10 resumes.

In the example shown in FIG. 27 an end of paragraph code further includes a code (EN) instructing the output unit to indent both margins with an EN space in the following paragraph. The output unit operation on the first line of the text in the next paragraph is indicated. In this case the line was justified in Range C (alpha is ZERO and beta is ONE), and the line was ended with a hyphen (the alpha and beta values are not both ONE'S in the word where gamma is ONE). In response to the detected indentation instruction, flip-flop 810 is set at the beginning of the line and the FSP programmer 836 is enables. That programmer in step Two conditions EN input of matrix 806 for transfer of that code signal through AND circuit 814. When FSP programmer 836 completes its stepping sequence, flip-flop 810 is cleared and text is translated from memory 10, including modification of the interwords with reference to the Range C control 158 which, in the illustrated example, has instructed the punch circuitry to insert an EM space with each space band. Upon sensing gamma (the end of the line), the ICC programmer 830 is again turned on for an eight step sequence. As alpha and beta are not both ONE'S at that point, a hyphen character is inserted through logic matrix 806 at $ICC_2$ step. At $ICC_5$ step, programmer 836 is again turned on and stepped through its sequence to insert an EN space at $FSP_2$. When ICC programmer 830 completes its stepping sequence (and appropriate character insertion), flip-flop 810 is cleared.

A third example is indicated in FIG. 28 in which the line of text includes two VR characters specifying tabulation in mode D. The PIP programmer 842 senses the tabulation mode output signal (line 714) from register 700, and is set to be stepped through its full sequence $PIP_{0-4}$. In $PIP_0$ mode flip-flop 810 remains cleared and text is translated from register 90. On detection of the first VR symbol, programmer 842 is stepped to $PIP_1$ mode, flip-flop 810 is set, and the EN line in matrix 806 is conditioned. In each punch cycle counter 740 is stepped down one and an EN space signal is translated to the output tape. When counter 740 is stepped to ZERO, programmer 842 is stepped to $PIP_2$ mode and flip-flop 810 is cleared to again translate text signals from register 90. On detection of the next VR symbol, programmer 842 is stepped to $PIP_3$ mode, flip-flop 810 is again set and the EN line in matrix 806 is conditioned. This time counter 742 is stepped down one in each punch cycle and when it is set to ZERO, programmer 842 is stepped to $PIP_4$ mode, flip-flop 810 is cleared, and the rest of the line of text is translated to the output tape. When gamma is detected, programmer 830 is turned on to insert the end of line code sequence.

*Shift register form of data processor*

A modified form of data processor, somewhat less complex than the above described embodiment, is illustrated in FIGS 29–36. This embodiment utilizes a shift register as the main word storage unit in place of memory 10, and justification control signals are generated by equipment coupled to a single stage of that register.

The system shown in FIG. 29 includes a source of data signals in the form of tape reader 1010 under the control of a read control unit 1012. In this embodiment of the invention this tape reader is adapted to read a six-channel tape punched in accordance with a teletype code. The generated signals are applied over cable 1014 to a two-stage character register 1016. The tape reader 1010 produces six-bit character signals at the rate of approximately one hundred per second and this rate controls basic system shifting speeds via the shift control unit 1018, whereby the signals are shifted through unit 1016 and the text shift register 1020 at that rate.

The auxiliary character register 1016 is employed to delete or revise characters in the input signal train as necessary prior to application to the text register for weight accumulation operations. For example, a delete code may be sensed by the auxiliary decoder 1022 and that code is deleted simply by sending a signal over the line 1024 to the shift control unit 1018 to effect the shift of that code out of register 1016, but block its insertion into text register 1020 (text register shift inhibited). Where the input text information includes justification information, for example, which is to be revised, it is necessary to delete such information as an end of line character, and any hyphen that precedes an end of line character. For this purpose, whenever an end of line character is sensed, a signal sent over line 1024 inhibits the text register shift for one character and whenever a hyphen precedes an end of line character, both characters are deleted by inhibiting two text register shift pulses.

Another revision is necessary to delete the separate case control characters ("upper case shift" and "lower case shift") as those characters per se should not be decoded in the line length accumulation operation. However, as indicated above, the case information must be retained, both for line casting machine control and to adjust the weight accorded the capitalized characters in the justification logic, and for this purpose there is provided a separate case control circuit 1026 which may be a flip-flop for example. The output of the flip-flop is applied to a separate or seventh channel in the switch unit 1028 so that this case information is transmitted along with the character information on the other six channels that are applied to the switch 1028 from the register 1016 over cable 1030. (Whenever a change of case is detected, the character is deleted by inhibiting the text register shift as above.)

The output of switch 1028 is applied over a seven channel cable 1032 to the twenty-four stage text shift register 1020. A seven channel feedback link 1034 couples the output stage 1036 of the shift register 1020 to the switch unit 1028 and this link is connected in circuit both for display control purposes when manual intervention is required and for recount operations so that the register 1020 is connected as a ring during those operations. Normally, however, switch unit 1028 is connected to transfer the data from cable 1030 to the text register 1020 via cable 1032. This text register is a reversible shift register of conventional type so that its contents may be shifted in either direction, that is, either forward or backward. The first stage 1038 of this register has a cancel code detector 1040 connected to it, which promptly upon sensing of a cancel code configuration causes the shift control 1018 to shift the text register backwards at a ten-kilocycle shifting rate to delete characters (by shifting out of register 1030) until a second character code is sensed, and then the remaining text register contents are shifted forward until their prior positions are reached. The slower forward shifting under the control of the tape reader need not be interrupted as this high speed shifting operation is approximately one hundred times faster than the tape reader shift. It will be recalled that a similar operation was performed by processer 16 of the previously described embodiment.

The twelfth stage 1050 of the text register 1020 has a seven channel connector 1052 coupled to decoder 1054. This decoder 1054, in response to information signals supplied on cable 1052, provides an outright signal over unique lines of cable 1056 to justification logic circuitry 1058. In similar manner, unique lines in cable 1060 are energized to control the pattern generator for the display by unit 1062 of a character, whose representative signals are stored in stage 1050 of the text register.

The justification logic 1058, as character signals are shifted through the text register 1020, accumulates character weight information as a function of line length, and when the number of characters to fill a line of selected length has been determined, the justification logic generates an end of line character (or characters) via code generation circuit 1070 and applies that character in synchronism with the data signals in the text register for insertion in the serial train of characters by means of insertion logic 1072. As the text signals are shifted out of register 1020, the case information level is sensed by case logic 1074 similar to the logic 1026 to generate a change of case character and restore that character to the serial data train. These operations are synchronized with the operation of the shift control 1018 via signals on the line 1076, and the write control unit 1078 controls the tape punch 1080 to store the translated data on punched tape in form suitable for controlling a line casting machine.

In many cases the justification logic can in itself locate a suitable end of line position and generate the character or characters to be inserted in the data train. However, should the justification logic not be able to automatically generate this end of line information, it supplies a manual intervention signal over line 1082 to the shift control 1018 for interrupting the supply of data by the read unit 1010. This manual intervention signal also turns on the display unit 1062 and enables the manual insertion control unit 84. Contents of the text register 20 (including at least one character beyond the "overset" point) are visually displayed by the display unit, alerting the operator to the fact that the justification logic is unable to insert end of line information and, by observing the displayed text information, the operator inserts the end of line indication at an appropriate point via a signal line 1086.

The manual intervention console is indicated in FIG. 30 with an illustrative display and associated manual controls similar to that shown in FIG. 4. A complete word (or up to twenty-four characters) are displayed on the screen 1090 of the display unit. The characters are displayed in reverse order from their disposition in the text register 1020 as indicated in FIG. 29 with portions thereof located on either side of the "overset" point indicator 1092. The manual controls include twelve hyphen insert push buttons 1094, an interword push button 1096, and a "bell mode" indicator button 1098. In addition, the control panel includes a line length selector 1100 and miscellaneous other controls generally indicated as elements 1102.

In the illustrated display on the control console, the overset point occurred at the second "t" in the word Massachusetts. If the operator wishes to hyphenate the displayed word after the "u," he would depress the push button 1104 and the justification logic, in response to the resulting signal from the manual insertion control, would insert an end of line code and hyphen at that point through the code generation circuitry 1070 and insertion logic 1072. Depression of the push button 1096 would place the end of line code information at the interword location (provided that interword was located within a pre-established range). In the illustrated display the interword is located before the "M," and as this location is outside of usual limits (typically established as a function of standard interword spacings), depression of the interword push button 1096 would not de-energize the display. In such case, the justification logic control (which specifies the established limits) can be overridden by means of the bell mode control 1098 and depression of the interword button 1096 then will cause the line to be ended before the "M." The bell mode button 1098 can also be employed where a selected hyphenation is outside the established limits in an overriding operation, and then the operator can cause the equipment to insert a hyphen at the desired point.

Further details of this circuitry and the coordinated operation of the system will be understood with reference to FIGS. 31–36.

The justification range logic is shown in greater detail in FIG. 31. This logic includes substantially the same type of space width counters as shown in FIG. 15, but the counter logic here is shown in simplified form. As shown in FIG. 31, a character value signal from decoder 1054 is transmitted over one line of cable 1056 to distributor 1110 for application to a pluggable memory unit in the form of a weighting matrix 1112. This weighting matrix assigns a weight to the decoded character signal as a function both of the character (including upper or lower case) and the type font to be employed. Adjustment for different type styles is accomplished merely by substituting one matrix unit for another. The weighting matrix has two sets of output lines, one for standard characters (cable 1114) and a second for interword characters (cable 1116).

Signals on these output lines condition gate units 1120–1124, and in the illustrated embodiment each unit includes six gates. A series of sixty-three pulses is applied to each gate unit from distributor 1130 to which pulses are supplied at a one hundred kilocycle rate from clock 1132 as controlled by gate 1134 (which is controlled by the decoder 1054 and distributor 1130). Depending on the gates in each unit 1120–1124 that are conditioned by signals over cables 1114 and 1116, any number of pulses from 0–63 may be applied over the output line from each gate unit.

The series of pulses from main character gate unit 1120 are applied through OR circuits 1140–1143 to step each accumulating counter 1150–1153 the same amount. (These counters are preset to a line length weight as specified by control 1100 by signals over line 1156 after each end of line code generation.) In response to each interword character, however, conditioning signals from which are applied over cable 1116, each of the gate units 1121–1124 accords a different weight to this character and gates a differing number of pulses so that the counters 1150–1153 are stepped differing amounts. The largest weight for an interword, for example an em value, is assigned to the gates 1121 and thus stored in the counter 1150. Correspondingly, smaller weights are assigned to the gates 1122 and 1123 and stored in corresponding counters 1151 and 1152, while the smallest permissible weight (minimum space band width for example) is assigned to gate 1124 and stored in counter 1153.

Also included in the justification logic are a set of four twelve stage shift registers, a marker register 1160, two justification range registers 1162 and 1164 and an interword register 1166, that are normally stepped in synchronism with the text register 1020. Each decoded interword generates a signal over line 1168 to set the first stage of interword register 1166, and this indication is set stepped along providing an indication of where interwords are located in the text register 1020.

When each counter is stepped to zero, it produces an output pulse on a line 1170 to set the corresponding flip-flop 1172, 1173, 1174, 1175, and that flip-flop then applies a signal through logic 1176 to set the first stage of one or both range registers 1162, 1164. When counter 1150 overflows, a level is supplied to range register 1164; when counter 1151 overflows, the level to register 1164 is removed and a level is applied to range register 1162; and when the counter 1152 goes to zero, levels are supplied to both range registers 1162 and 1164. Finally, when the counter 1153 is set to zero, flip-flop 1175 is set and produces an output signal on line 1180 which indicates "overset," i.e., that there is not sufficient room in the line for the character currently in stage 1050 of the text register 1020.

At this point an indication of the locations of all the interwords in the twelve decoded character spaces is stored in the interword register 1166 and "range" indications of four line lengths for various interword weights are stored in the range registers 1162 and 1164. An illustrative example of the contents of these registers is shown in FIG. 32: the fourth and sixth stages of interword register 1166 being set as indications of the interwords in the last twelve stages of text register 1020; stages 1–3 and 7–9 of register 1164 being set; and stages 1–6 of register 1162 being set. (It will be understood that the number of stages set in range registers 1162, 1164 is a function of the number of interwords in the line and the illustration is entirely arbitrary.)

Details of the line end position determining logic are shown in FIG. 33. The registers shown in FIG. 33 are in mirror relation to the showing in FIG. 21. Coupled to the group of registers 1160, 1162, 1164, 1166 are two sets of AND logic 1182 and 1184. These logic units may take several forms, but for illustrative purposes one form for each stage of logic is indicated in FIGS. 34 and 35. FIG. 34 includes an AND circuit 1186 having conditioning inputs from the four registers 1160, 1162, 1164, and respectively. A logic stage of unit 1182 as shown in 1166 and an output line 1188. A logic stage for unit 1184 includes a three input AND circuit 1190 and the OR circuits 1192 and 1194 and has an output line 1196. One input of AND circuit 1190 is connected to the corresponding stage of marker register 1160 and the other inputs are from the OR circuits. OR circuit 1192 has an input from interword push button 1096 and another input from the hyphen buttons 1094, while OR circuit 1194 has inputs from registers 1162 and 1164, and from the bell mode button 1098.

With reference again to FIG. 33, the output signal on line 1180 from flip-flop 1175 (FIG. 31) is applied through OR circuit 1200 to set the first stage 1202 of marker register 1160. The setting of that stage of the marker register applies a signal through OR circuit 1204 to set the automatic search flip-flop 1206 and the resulting output level conditions gate 1208 to pass pulses from a ten-kilocycle clock source 1210 to step the marker through that register. (This stepping operation is performed independently of the text or other logic registers.)

AND logic unit 1182 will produce an output on line 1188 if the corresponding stages of all three registers 1162, 1164, 1166 are set when the marker being stepped through the marker register 1160 reaches that stage. This condition can arise only if an interword is located within the smallest justification range.

In such event, a pulse from AND circuit logic unit 1182 is applied over line 1188 through OR circuit 1212 to clear the flip-flop 1206. This removes the conditioning level from gate 1208 and the marker does not shift further through the marker register 1160. As this operation occurs at a much more rapid rate than the shifting produced by the read control unit 1012 (the shifting rate is approximately one hundred times faster), the text shifting operation need not be interrupted. The marker, as positioned, is then shifted with the text and logic, and when it reaches the end of register 1160, this information is applied to code generation circuit 1070 to insert the proper control information in the serial train of textural information.

However, should no interword be located in the smallest justification range, AND logic unit 1182 will not produce an output, and the marker will be stepped all the way through the marker register 1160 and produce an output pulse on line 1214 which will pass through OR circuit 1212 to clear the flip-flop 1206 and terminate the application of shifting pulses to the marker register and at the same time will set the manual intervention flip-flop 1216.

The setting of this flip-flop produces a level on line 1218 which enables the hyphen push buttons 1094 so that depression of one of those push buttons will produce an output signal from the push button circuitry 1220. This level also conditions a gate 1222 which then will pass a signal on line 1224 from the interword push button 1096, gate 1226 (which is used for feedback control), and gate 1228 which is connected to output 1196 of AND logic unit 1184.

This output level is also applied to the shift control unit 1018 to interrupt the normal shifting operation of text signals by the read unit 1010; to operate switch 1028 to close the feedback loop 1034 so that the contents of the text register may be preserved; and operates to energize the display control and shifting circuitry, details of which are shown in FIG. 36.

This display control and shifting circuitry is also substantially the same as that indicated in FIG. 16 and includes a counter 1250 which is reversible and may be stepped in the forward direction from zero to twelve and in the reverse direction from twelve to zero. The counter has outputs at the zero, eleven and twelve stages as indicated. This counter keeps track of deflection signals applied to the display 1062 and associated pattern generator which may be of the type shown in the Gordon et al. Patent No. 2,920,312. The text register 1020 and counter 1250 are stepped in response to pulses from a one kilocycle clock 1252 with the individual dots of the display being supplied from a one hundred kilocycle source so that all possible dot locations are generated during each stepping cycle of the shift register. The shifting pulses are supplied from source 1252 through gate 1254 to a pair of gates 1256, 1258 which are alternately conditioned by the direction control flip-flop 1260.

The application of shift pulses from source 1252 is controlled by a display control flip-flop 1262 which, when set, applies an output level to condition gate 1254. The flip-flop setting pulse is also applied to clear counter 1250 and to set sign control flip-flop 1263. The setting transition of flip-flop 1262 also applies a pulse through OR circuit 1266 to set the direction control flip-flop 1260, conditioning gate 1258 to transmit pulses to step the text register 1020 in the backward direction and correspondingly cause deflection of the character display electron beam in the opposite direction as controlled by sign control flip-flop 1263 and the conditioned gate 1264 or 1265. At the same time the stepping pulses are applied to the counter 1250 to maintain a record of the starting point of this stepping operation.

A second OR circuit 1268, complementary to OR circuit 1266, is provided, an output from which complements flip-flop 1260 to apply shift pulses to the text register in the forward direction. The OR circuits have a common input from counter stage twelve (line 1270), and similar inputs from interword code sensing circuitry (lines 1272, 1274). OR circuit 1268 also has an input on line 1276 from the stage eleven of the counter 1250 (conditional on the existence of an interword signal in the next stage of the text register.

When the manual intervention flip-flop 1216 (FIG. 33) is set, a pulse is transferred over line 1280 through OR circuit 1282 to set the shift control flip-flop 1262 and to reset counter 1250. The output level from the set shift control flip-flop initiates shifting and also conditions one input of AND circuit 1282, the second input of which is conditioned by the level on line 1218 from the set manual intervention flip-flop to enable the pattern generator and display 1062. The contents of the text register are shifted backwards with the number of steps being recorded in the counter 1250. As the contents of stage 1050 of the text register 1020 change, the characters stored therein are displayed on the screen 1090 of the display unit 1062. As soon as an interword character is sensed at stage 1050 of the text register, a pulse is applied over lines 1272, 1274 through the OR circuits 1266 and 1268 to complement the direction control flip-flop 1260 so that the stepping direction of the text register 1024 is reversed. The stepping pulses are then applied to counter 1250 to step it down toward zero. If no interword should be found within the contents of the text register, shifting will continue in the backward direction until the counter reaches the value twelve at which time an output pulse will be applied over line 1270 to the OR circuits 1266 and 1268 to complement the direction control flip-flop 1260 and similarly to transfer shifting from the backward direction to the forward direction.

When the counter reaches zero, an output pulse is generated which complements flip-flop 1263 and samples gate 1290. This gate is conditioned by level (line 1292) supplied by the manual intervention flip-flop 1216 when it is in the cleared state. If that flip-flop is not cleared, shifting continues with the counter 1250 being stepped through zero and the count increased from zero to twelve or to the first detected interword, whichever occurs first. On either occurrence the directional control flip-flop 1260 is again complemented and the directional shifting of the text register is reversed.

This shifting continues until the manual intervention flip-flop is cleared. After that time when the counter 1250 is next stepped to zero, the output pulse is passed by the conditioned gate 1290 to clear the shift control flip-flop 1262. This operation removes the conditioning level from the display 1062 and from the shifting control gate 1254. It will be noted that through this control, the contents of the text register 1020 are restored to the position they occupied prior to the start of shifting. The switch 1028 is returned to its initial position and the shift control unit 1018 allows the tape reader to resume operation.

With reference once again to FIG. 33, with the setting of the manual intervention flip-flop 1216, gates 1222 and 1226 are conditioned, as well as push button circuitry 1220, enabling an output from the logic unit 1184. As indicated above, this logic unit operates in response to manual intervention signals by the operator monitoring the display. This manual intervention may take place through use of the hypen push button 1094, the interword push button 1096, or either of those push buttons in combination with the bell mode push button 1098.

Depression of a hypen push button 1094 when the push button circuitry 1220 is enabled will apply an output pulse to the corresponding stage of the marker register to set that stage. That output signal will also be applied through the OR circuit 1192 to the AND circuit 1190 of the logic unit 1184. As the depression of the push button has applied a signal over one of the lines 1296 to set the corresponding stage in the marker register 1160, the second input to the AND circuit 1190 is also conditioned. If a stage of either range register 1164 or 1166 is set (indicating that the selected hyphenation point is within the pre-established ranges of standard interword values), the third input of the AND circuit 1190 is conditioned and an output pulse signal is produced on line 1196 which is passed by the conditioned gate 1220 to clear the manual intervention flip-flop 1216. With this operation, the flip-flop 1216 produces an output level on line 1292 (FIG. 36) so that the display will be turned off and normal shift operations resumed when the counter 1250 next is set to zero.

However, should the selected stage be outside of the established justification ranges as determined by the contents of the registers 1162 and 1164, the level from the push button circuitry 1220 which sets a stage in the marker register is also applied on line 1298 to delay circuit 1300, the conditioned gate 1302 and OR circuit 1204 to set the automatic search flip-flop 1206. This operation conditions gate 1208 to pass shift pulses from clock 1210 to the marker register and shift out the marker that was placed in that register by operation of the push button circuitry 1220. When the shift out of the marker produces a pulse on line 1214, that pulse, as before, clears the automatic search flip-flop 1206 through OR circuit 1212. While the pulse is also applied to the manual intervention flip-flop 1216, it has no effect as that flip-flop is remained in set condition. The fact that the display was not turned off in response to the depression of hyphen push button 1094 signals the operator that the hyphenation point he selected is outside of the normal justification range. In this case, he can either select another hyphenation point closer to the overset position, or depress the bell mode push button 1098. If the latter course of action is chosen, a signal is stored for application to the code generation circuit 1070 indicative of the fact that the end of line position was determined through the use of the bell mode logic, and an input is applied to the OR circuit 1194 which overrides the effect of the contents of the logic registers 1164 and 1166. When a hyphen push button is again depressed, that operation will condition the OR circuit 1192 and the corresponding marker register stage that is set will condition the AND circuit 1190 so that an output pulse will be produced on line 1196. This output pulse will turn off the manual intervention flip-flop.

A second mode of operation that is possible is through the use of the interword push button 1096. Depression of this push button applies a pulse on line 1224 which is passed by the conditioned gate 1222 and OR circuit 1200 to set the first stage 1202 of the marker register 1160. The setting of this stage sets the automatic search flip-flop 1206 which in turn conditions gate 1208 to pass shift pulses to step the marker through the marker register. If a coincidence is detected between the marker and an indicator in the interword register 1166 (sensed by AND circuit 1197) within the justification range specified by the contents of registers 1162 and 1164, AND circuit 1190 will produce an output when the marker in register 1160 reaches that point. This output is passed by the conditioned gate 1228 through the OR circuit 1212 to turn off the automatic search flip-flop 1206 positioning the marker at that stage and also to turn off the manual intervention flip-flop 1216 so that the display will be turned off when the counter 1250 next is stepped to zero. It will be noted that the logic is effective to enable response to the interword push button 1096 only when the display is operative.

Further, if desired, the operator can override the justification range logic contents of registers 1164 and 1166 by means of the bell mode push button and insert an end of line signal at an interword location through the depression of first the bell mode of the push button 1098 and then the interword button 1096.

In addition to display control, the shift control logic shown in FIG. 33 is also employed in connection with the deletion of characters or detection of a cancel word symbol and, in a recount operation of the contents of the text register 1020, to provide a proper count for justification of the next line after the end of line codes have been inserted.

In the cancel word control, flip-flop 1310 is set when a cancel code is detected at stage 1038. The resulting signal from the cancel flip-flop 1310 is applied as a pulse through OR circuit 1282 to set the shift control flip-flop which conditions gate 1254 and at the same time sets the directional control flip-flop through OR circuit 1266 to initiate shifting of the contents of the text register 1020 in the backward direction. The counter 1250 is stepped at this time, but the display is not turned on and switch 1028 is not actuated as AND circuit 1284 is not fully conditioned. Stepping continues until the counter 1250 reaches twelve or an interword is detected at stage 1038. On either occurrence, a pulse is applied through OR circuit 1268 to complement the flip-flop 1260 and step the counter 1250 in the opposite direction. The contents of text register 1020 are shifted forward at the one kilocycle rate back to their initial position at which point the zero output from the counter is passed through gate 1290 (which is conditioned as this is not a manual intervention situation) to clear flip-flop 1262 and terminate shift pulse transmission.

The recount operation is necessary to include in the accumulated count of the next line those contents of the text register 1020 between stage 1050 and the last stage at the time the end of line codes are generated. As indicated above, that occurs when the marker in the register 1160 is stepped out. In response thereto, the recount flip-flop 1312 is set, producing an output level which actuates switch 1028 to connect feedback link 1034 in circuit, and an output pulse which is applied through OR circuit 1282 to reset counter 1250 and to set the shift control flip-flop 1262. In the same manner as before with the setting of this flip-flop, pulses are generated at a one kilocycle rate to shift the contents of the text register back twelve stages (or eleven stages if the twelfth character is an interword). The link 1034 is opened after the eleventh forward shift in this latter case to delete the interword. When a pulse signal is applied to either line 1270 or 1276, the direction control flip-flop is complemented to apply stepping pulses in the forward direction and the justification logic 1058 is also enabled simultaneously to accumulate the weight count of these twelve characters at the high speed shifting rate. (The interword inputs 1272, 1274 to the directional control flip-flop 1270 are disabled during this operation as the display circuit is inactive so that an interword does not cause the directional control flip-flop 1260 to be complemented prematurely.) As the contents of the shift register are shifted forward with the corresponding count being reduced in the counter 1250, the justification logic stores the weights of the characters in these twelve stages. When the counter 1250 reaches zero, the output pulse is passed by gate 1290 to clear the shift control flip-flop, terminating the shifting. At this time the circuitry is ready for further shifting operations from the read unit 1010 and all the control flip-flops in the justification logic, the shift control, etc. are reset in anticipation of the next cycle of operation.

While two detailed embodiments of the invention, and modifications thereof, have been shown and described, similar additional modifications of the invention will be apparent to those skilled in the art. Therefore, it is not intended that the invention be limited to the embodiments or to details thereof and departures may be made therefrom within the spirit and scope of the invention as defined in the claims.

What is claimed is:

1. A data processing system comprising serial data storage means for storing signals representative of data items,
   a plurality of data processing units arranged in succession,
   each successive processing unit being arranged to extract from said data storage means and processing data items entered in said data storage means by the preceding processing unit, and then to reenter the additionally processed data items in said data storage means,
   and control means for preventing each said succeeding processing unit from extracting from said storage means a data item that has not been processed by the preceding data processing unit.

2. The system as claimed in claim 1 and further including a time-shared data transfer channel through which each said data processing unit has access to said data storage means.

3. The system as claimed in claim 1 wherein said data storage means is addressable and each said processing unit includes an addresser for specifying the memory address to which that processing unit has access, means for stepping each addresser to specify adjacent memory addresses to control translation of data items with respect to a series of storage locations, and said control means includes a comparator coupled between the addressers of a pair of adjacent processing units.

4. The system as claimed in claims 3 wherein the system is arranged to process data items in a group and further including means for controlling the addresser of one of said data processing units to step in either forward or backward direction and extract from said data storage means signals representative of the data items in the entire group being processed by said one unit and wherein said one data processing unit includes means responsive to the completion of processing of said group of data items by said one unit to store the address of the last data item in that processed group.

5. The system as claimed in claim 1 wherein said control means further includes means for enabling alternate operation of adjacent data processing units comprising means to stop one processing unit after completion of a processing of a group of data items until the adjacent processing unit has completed the further processing of that group of data items.

6. The system as claimed in claim 1 wherein a first processing unit includes means for generating control information as a function of each data item processed by it and means for storing said generated control information in said data storage means with the processed data item,
   and wherein a second processing unit includes means for utilizing the stored control information for processing the stored data item signals and producing an output signal train.

7. The system as claimed in claim 6 further including auxiliary storage means for storing control information generated by said first processing unit and wherein said second processing unit further includes means to utilize both the control information stored with the data items in said data storage means and the control information in auxiliary storage means for generating said output signal train.

8. The system as claimed in claim 6 wherein said second processing unit includes means responsive to signals stored in said data storage means to incorporate in said output signal train signals representative of each stored data item sensed by said second processing unit, and alternately operative means responsive to said control information for inserting signals representative of supplementary data items in said output signal train.

9. Data processing apparatus comprising serial data storage means for storing signals representative of a serial train of data items,
   a data item decoder coupled to at least one stage of said serial data storage means,
   data item translation circuitry coupled to said decoder for providing a translation signal for each sensed data item in said serial train,
   data item display means,
   means responsive to a predetermined output of said translation circuitry to generate output signals automatically in response to the sensing of a predetermined criterion and to enable said display means for display of data items in said storage means in the absence of the sensing of said predetermined criterion,
   and manual means responsive to the enabling of said display for generating output signals as a function of the display.

10. The apparatus as claimed in claim 9 wherein said display means includes a counter,
    means to sense signals representative of data items in said serial data storage means serially,
    and means to step said counter in synchronism with said serial data item sensing to control the display of data items,
    and means responsive to said manual means for generating signals representative of a data item for insertion into said signal train as a function of the data items displayed by said display means.

11. The apparatus as claimed in claim 10 wherein said counter is reversible,
    said signal sensing means includes means to deflect said display means in a series of steps, and further including means to reverse the direction of display deflection and counter stepping in response to the sensing for display of signals representative of a predetermined data item.

12. The system as claimed in claim 11 and further including means to reverse the direction of counter stepping in response to a predetermined counter output.

13. The system as claimed in claim 12 and further including means to terminate the energization of said display means in response to a predetermined counter output.

14. The apparatus as claimed in claim 9 wherein said serial data storage means includes main shift register means and said translation circuitry includes auxiliary shift register means, means to place information in said auxiliary shift register means as a function of the contents of said main shift register means, and means to shift said main and auxiliary shift register means in synchronism to generate signals representative of a data item for insertion in said serial signal train as a function of the contents of said auxiliary shift register means.

15. The apparatus as claimed in calim 9 wherein said serial data storage means includes an addressable memory unit that has multiplicity of data item storage locations addressable in sequence, and said translation circuitry includes means to generate and store control information with a data item in each storage location.

16. The apparatus as claimed in claim 9 wherein said translating circuitry includes means to provide a data item weight signal for each sensed data item and means for accumulating said weight signals.

17. The apparatus as claimed in claim 16 further including means responsive to either said accumulating means or said manual means for generation and insertion of an end-of-data-item-group signal into said serial train.

18. The apparatus as claimed in claim 17 and further including means operative on insertion of said end-of-data-item group signal in said serial train to generate additional control information as a function of said end-of-data-item-group signal.

19. The apparatus as claimed in claim 17 and further including means operative on insertion of said end-of-data-item group signal in said serial train to shift text signals in said serial data storage means backwards and then forward at a higher shift rate than the normal shift rate.

20. The apparatus as claimed in claim 9 wherein display means includes a counter, and means to step said counter in synchronism with serial sensing of data items in said storage means to control the display of said data items.

21. The apparatus as claimed in claim 20 wherein said counter is reversible, said data item sensing means includes means to display means in a series of steps, and means to reverse the direction of display stepping and counter stepping in response to the sensing for display of signals representative of a predetermined data item.

22. The apparatus as claimed in claim 21 further characterized by the provision of means to reverse the direction of display and counter stepping in response to a predetermined counter output.

23. The apparatus as claimed in claim 22 further characterized by the provision of means to terminate the energization of said display means in response to a predetermined counter output.

24. The apparatus as claimed in claim 9 wherein said translation circuitry is one of a plurality of data processing units arranged in succession, each successive processing unit being arranged to extract from said data storage means and processing data items entered in said data storage means by the preceding processing unit, and then to reenter the additionally processed data items in said data storage means, and control means for preventing each said succeeding processing unit from extracting from said storage means a data item that has not been processed by the preceding data processing unit.

25. The apparatus as claimed in claim 24 and further including a time-shared data transfer channel through which each said data processing unit has access to said data storage means.

26. The apparatus as claimed in claim 24 wherein said data storage means is addressable and each said processing unit includes an addresser for specifying the memory address to which that processing unit has access, means for stepping each addresser to specify adjacent memory addresses to control translation of data items with respect to a series of storage locations, and said control means includes a comparator coupled between the addressers of a pair of adjacent processing units.

27. The apparatus as claimed in claim 26 wherein the system is arranged to process data items in a group and further including means for controlling the addresser of one of said data processing units to step in either forward or backward direction and extract from said data storage means signals representative of the data items in the entire group being processed by said one unit and wherein said one data processing unit includes means responsive to the completion of processing of said group of data items by said one unit to store the address of the last data item in that processed group.

28. The apparatus as claimed in claim 24 wherein said control means further includes means for enabling alternate operation of adjacent data processing units comprising means to stop one processing unit after completion of processing of a group of data items until the adjacent processing unit has completed the further processing of that group of data items.

29. The apparatus as claimed in claim 24 wherein a first processing unit includes means for generating control information as a function of each data item processed by it and means for storing said generated control information in said data storage means with the processed data item, and wherein a second processing unit includes means for utilizing the stored control information for processing the stored data item signals and producing an output signal train.

30. The system as claimed in claim 29 further including auxiliary storage means for storing control information generated by said first processing unit and wherein said second processing unit further includes means to utilize both the control information stored with the data items in said data storage means and the control information in auxiliary storage means for generating said output signal train.

31. Apparatus for inserting justification information in a serial train of text items comprising storage means for storing signals representative of said text items, means for specifying the length of a line of text as a function of said text item signals, means for sensing said text item signals to accumulate signals representative of said text items as a function of said specified line length and generate a maximum line length signal in coordination with said text item signals, means for automatically selecting an acceptable end of line location and generating a signal representative as a function of the accumulated text item signals, and means for enabling an operator to insert a hyphenation symbol in said serial train of text items when said automatic selecting means does not generate said signal representative of an end of line location.

32 The apparatus as claimed in claim 31 wherein said text item sensing means includes a plurality of counters,
means to control said counters so that each counter produces an output signal in response to a different input condition,
means to step all of said counters in response to signals representative of each sensed text item, and
wherein the output signal from one of said counters generates said maximum line length signal.

33. The apparatus as claimed in claim 31 and further including means to vary the signals to be accumulated as a function of the type font in which the line of text items is to be printed.

34. The apparatus as claimed in claim 31 wherein said hyphenation symbol insertion means includes means to display a group of text items adjacent the text item being sensed by said sensing means when said maximum line length signal is generated, and
means coordinated with said display means for enabling the operator to select a position between particular ones of said displayed text items in which said hyphenation symbol should be inserted.

35. The apparatus as claimed in claim 31 and further including means for inserting in said serial train of text items supplementary signals representative of spaces comprising means to cause said signal sensing means to accumulate signals representative of said spaces,
means to count the number of space signals sensed by said signal sensing means, and
means responsive to said space signal counter means to control the location of insertion of space signals in said signal train.

36. The apparatus as claimed in claim 35 wherein said space signal insertion control means includes means to insert a space between each of a series of pairs of text items.

37. The apparatus as claimed in claim 35 wherein said space signal insertion control means includes means to insert a group of spaces at a particular location in said serial train of text items.

38. Apparatus for inserting justification information in a serial train of text items comprising addressable storage means for storing signals representative of said text items,
a data processing unit including an addresser normally arranged for stepping in the forward direction for enabling said data processing unit to sense text item signals stored in said storage means in sequence,
means responsive to a sensed text item to revise the signals representative of a text item, and
means to step said addresser in the backward direction in accordance with the nature of a sensed text item and in conjunction with revision of text item signals.

39. Apparatus for inserting justification information in a serial train of text items comprising serial storage means for storing signals representative of said text items,
a data processing unit including an addresser for controlling the access of said data processing unit to said storage means for processing said text items in sequence,
each said text item being defined by a plurality of bits disposed in a word,
means responsive to text item bits in each sensed word to generate a control signal as a function of the previous data words processed by said data processing unit and store each said control signal as a plurality of bits with the text item bits in the data word, and
means responsive to the completion of processing of a group of text items by said processing unit to revise the control information bits stored within each data word of that processed group of text items.

40. The apparatus as claimed in claim 39 and further including a second data processing unit including an addresser for controlling the access of said second data processing unit to said storage means for processing said data words in sequence, and producing an output signal train means responsive to signals stored in said serial storage means to incorporate in said output signal train signals representative of the stored text items sensed by said second processing unit, and alternately operative means responsive to said control signal bits for inserting signals representative of supplementary data items in said output signal train.

41. Apparatus for inserting justification information in a serial train of text items comprising storage means for storing signals representative of said text items,
and a data processing unit arranged to process said text items in sequence including means for specifying the length of a line of text as a function of said text item signals,
means for sensing said text item signals to accumulate signals representative of said text items as a function of said specified line length and generate a maximum line length signal in coordination with said text item signals,
means for automatically selecting an acceptable end of line location and generating a signal representative as a function of the accumulated text item signals, and
means for inserting in said serial train of text items supplementary signals representative of spaces comprising means to cause said signal sensing means to accumulate signals representative of said spaces,
means to count the number of space signals sensed by said signal sensing means, and
means responsive to said space signal counter means to control the location of insertion of space signals in said signal train.

42. The apparatus as claimed in claim 41 wherein said space signal insertion control means includes a programmer,
a first counter responsive to text words,
a second counter responsive to text items,
and means to sense said programmer and said first and second counters to insert a space between each of a series of pairs of text items in said signal train.

43. The apparatus as claimed in claim 41 wherein said space signal insertion control means includes a mode control register,
a counter, and
means to sense said register and said counter to insert a group of spaces at a particular location in said signal train.

44. The apparatus as claimed in claim 41 and further including a second data processing unit arranged for access to said storage means to process data items in sequence and produce an output signal train comprising means responsive to signals in said storage means for incorporating in said output signal train signals representative of the stored text items sensed by said second processing unit, and
alternately operative means responsive to said space signal insertion control means for inserting in said output signal train signals representative of said spaces.

No references cited.

ROBERT C. BAILEY, *Primary Examiner.*

R. ZACHE, *Assistant Examiner.*